US012562164B2

(12) United States Patent
Miller et al.

(10) Patent No.: US 12,562,164 B2
(45) **Date of Patent: \*Feb. 24, 2026**

(54) TEMPORARY ACCOUNT ASSOCIATION WITH VOICE-ENABLED DEVICES

(71) Applicant: Amazon Technologies, Inc., Seattle, WA (US)

(72) Inventors: Rebecca Joy Lopdrup Miller, Seattle, WA (US); Liron Torres, Redmond, WA (US); Kadirvel Chockalingam Vanniarajan, Mercer Island, WA (US); Gonzalo Alvarez Barrio, Seattle, WA (US); Dick Clarence Hardt, Seattle, WA (US)

(73) Assignee: Amazon Technologies, Inc., Seattle, WA (US)

( \* ) Notice: Subject to any disclaimer, the term of this patent is extended or adjusted under 35 U.S.C. 154(b) by 278 days.

This patent is subject to a terminal disclaimer.

(21) Appl. No.: 18/229,898

(22) Filed: Aug. 3, 2023

(65) Prior Publication Data

US 2024/0071382 A1    Feb. 29, 2024

Related U.S. Application Data

(63) Continuation of application No. 17/098,805, filed on Nov. 16, 2020, now Pat. No. 11,763,808, which is a
(Continued)

(51) Int. Cl.
*G10L 15/22* (2006.01)
*G06F 3/16* (2006.01)
*H04W 4/14* (2009.01)

(52) U.S. Cl.
CPC .............. *G10L 15/22* (2013.01); *G06F 3/167* (2013.01); *H04W 4/14* (2013.01)

(58) Field of Classification Search
CPC ... G10L 15/22; G10L 2015/223; G06F 3/167; G06F 3/16; H04W 4/14; H04L 63/0876; H04L 63/0428; H04L 9/40
See application file for complete search history.

(56) References Cited

U.S. PATENT DOCUMENTS 9,361,084 B1 \* 6/2016 Costa ..................... G10L 15/22
9,990,176 B1    6/2018 Gray
(Continued)

FOREIGN PATENT DOCUMENTS

CN      104050967 A     9/2014
EP      0018129 A1     10/1980
(Continued)

OTHER PUBLICATIONS

Chinse Office Action mailed Dec. 29, 2023 for Chinese Application No. 2019800354079, a foreign counterpart to U.S. Pat. No. 10,847,153, 16 pages.
(Continued)

*Primary Examiner* — Huyen X Vo
(74) *Attorney, Agent, or Firm* — Nicholson De Vos Webster & Elliott LLP

(57) ABSTRACT

Systems and methods for temporarily associating user accounts with voice-enabled devices are disclosed. A voice-enabled device, which may be associated with a default account, may be situated in an environment, such as a hotel room. A user may desire to utilize the voice-enabled device to perform one or more actions. In examples, some or all of the actions may require the use of a system resource not available to the default account. In these examples, the user may provide contact information to be used to send a message to personal device of the user to acquire user account information. Upon receipt of such information, the user account may be temporarily associated with the voice-enabled device, and may be dissociated from the voice-enabled device, and may be dissociated from the voice-
(Continued)

enabled device upon the lapse of a period of time and/or occurrence of a dissociation event.

20 Claims, 14 Drawing Sheets

Related U.S. Application Data continuation of application No. 16/001,763, filed on Jun. 6, 2018, now Pat. No. 10,847,153.

(56) References Cited

U.S. PATENT DOCUMENTS

| | | | |
|---|---|---|---|
| 2013/0183944 | A1 | 7/2013 | Mozer et al. |
| 2015/0088514 | A1 | 3/2015 | Typrin |
| 2015/0382047 | A1* | 12/2015 | Van Os ............ H04N 21/41265 |
| | | | 725/38 |
| 2016/0182931 | A9 | 6/2016 | Setos |
| 2017/0076720 | A1 | 3/2017 | Gopalan et al. |
| 2017/0076727 | A1 | 3/2017 | Ding et al. |
| 2018/0007060 | A1 | 1/2018 | Leblang et al. |
| 2018/0052824 | A1 | 2/2018 | Ferrydiansyah et al. |
| 2018/0096690 | A1 | 4/2018 | Mixter |
| 2018/0374486 | A1* | 12/2018 | Zhao ........................ G10L 17/22 |
| 2019/0166255 | A1 | 5/2019 | Reddy |
| 2019/0197231 | A1 | 6/2019 | Meier |
| 2019/0245978 | A1 | 8/2019 | Warrick |
| 2019/0378499 | A1 | 12/2019 | Miller et al. |
| 2019/0378500 | A1 | 12/2019 | Miller et al. |
| 2021/0065711 | A1 | 3/2021 | Miller et al. |

FOREIGN PATENT DOCUMENTS

| | | |
|---|---|---|
| WO | WO2016007801 | 1/2016 |
| WO | WO2018004935 | 1/2018 |
| WO | WO2019118933 A1 | 6/2019 |

OTHER PUBLICATIONS

European Office Action mailed Apr. 25, 2023 for European patent application No. 19814400.8, a foreign counterpart of U.S. Pat. No. 10,847,153, 4 pages.

Partial European Search Report mailed Oct. 26, 2021 for European Patent Application No. 19814400.8, a foreign counterpart to U.S. Pat. No. 10,847,153, 14 pages.

Extended European Search Report mailed Mar. 25, 2022 for European Patent Application No. 19814400.8, 15 pages.

Office Action for U.S. Appl. No. 17/098,805, mailed on Jan. 19, 2023, Rebecca Joy Lopdrup Miller, "Temporary Account Association With Voice-Enabled Devices", 10 pages.

Office Action for U.S. Appl. No. 16/001,763, mailed on Mar. 31, 2020, Miller, "Temporary Account Association With Voice-Enabled Devices", 8 Pages.

Office Action for U.S. Appl. No. 16/001,823, mailed on Nov. 29, 2019, Miller, "Temporary Account Association With Voice-Enabled Devices", 9 Pages.

PCT Invitation to Pay Additional Fees mailed on Aug. 13, 2019, for PCT Application No. PCT/US2019/035650, 2 Pages.

PCT Search Report and Written Opinion mailed on Oct. 16, 2019 for PCT Application No. PCT/US10/35650, 11 pages.

International Preliminary Report on Patentability, PCT App. No. PCT/US19/35650, Dec. 17, 2020, 8 pages.

International Search Report and Written Opinion, PCT App. No. PCT/US19/35650, Oct. 16, 2019, 10 pages.

Non-Final Office Action, U.S. Appl. No. 16/001,763, Mar. 31, 2020, 9 pages.

Non-Final Office Action, U.S. Appl. No. 16/001,823, Mar. 10, 2020, 10 pages.

Non-Final Office Action, U.S. App. No. 16/001,823, Nov. 29, 2019, 10 pages.

Non-Final Office Action, U.S. App. No. 17/098,805, Jan. 19, 2023, 11 pages.

Notice of Allowance, U.S. Appl. No. 16/001,763, Jul. 16, 2020, 8 pages.

Notice of Allowance, U.S. App. No. 17/098,805, May 3, 2023, 8 pages.

Requirement for Restriction/Election, U.S. Appl. No. 16/001,763, Jan. 22, 2020, 8 pages.

Office Action for Chinese Application No. 201980035407.9, Dated Jul. 31, 2024, 4 pages.

* cited by examiner

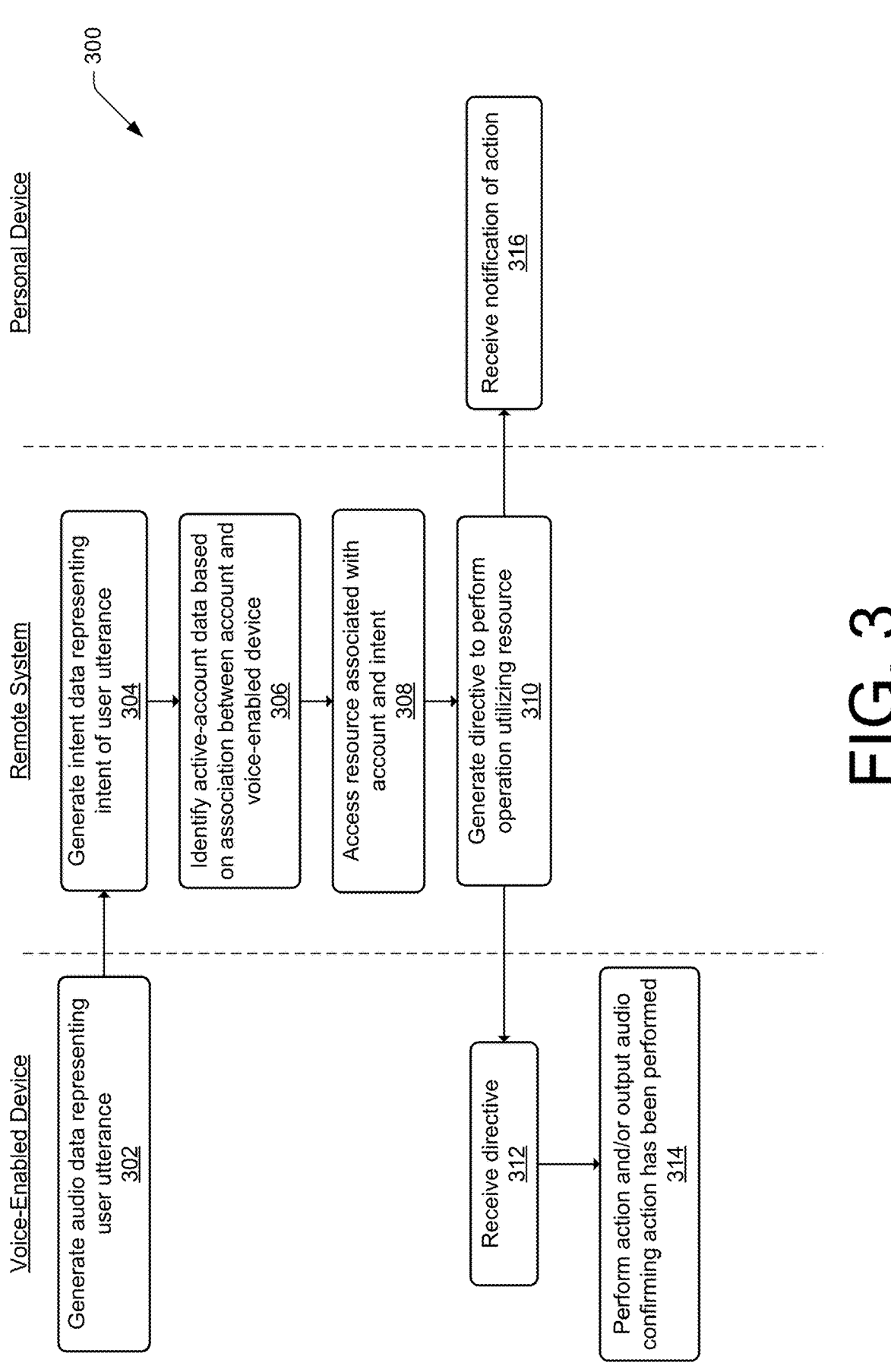

300

Personal Device

Receive notification of action
316

Remote System

Generate intent data representing intent of user utterance
304

Identify active-account data based on association between account and voice-enabled device
306

Access resource associated with account and intent
308

Generate directive to perform operation utilizing resource
310

Voice-Enabled Device

Generate audio data representing user utterance
302

Receive directive
312

Perform action and/or output audio confirming action has been performed
314

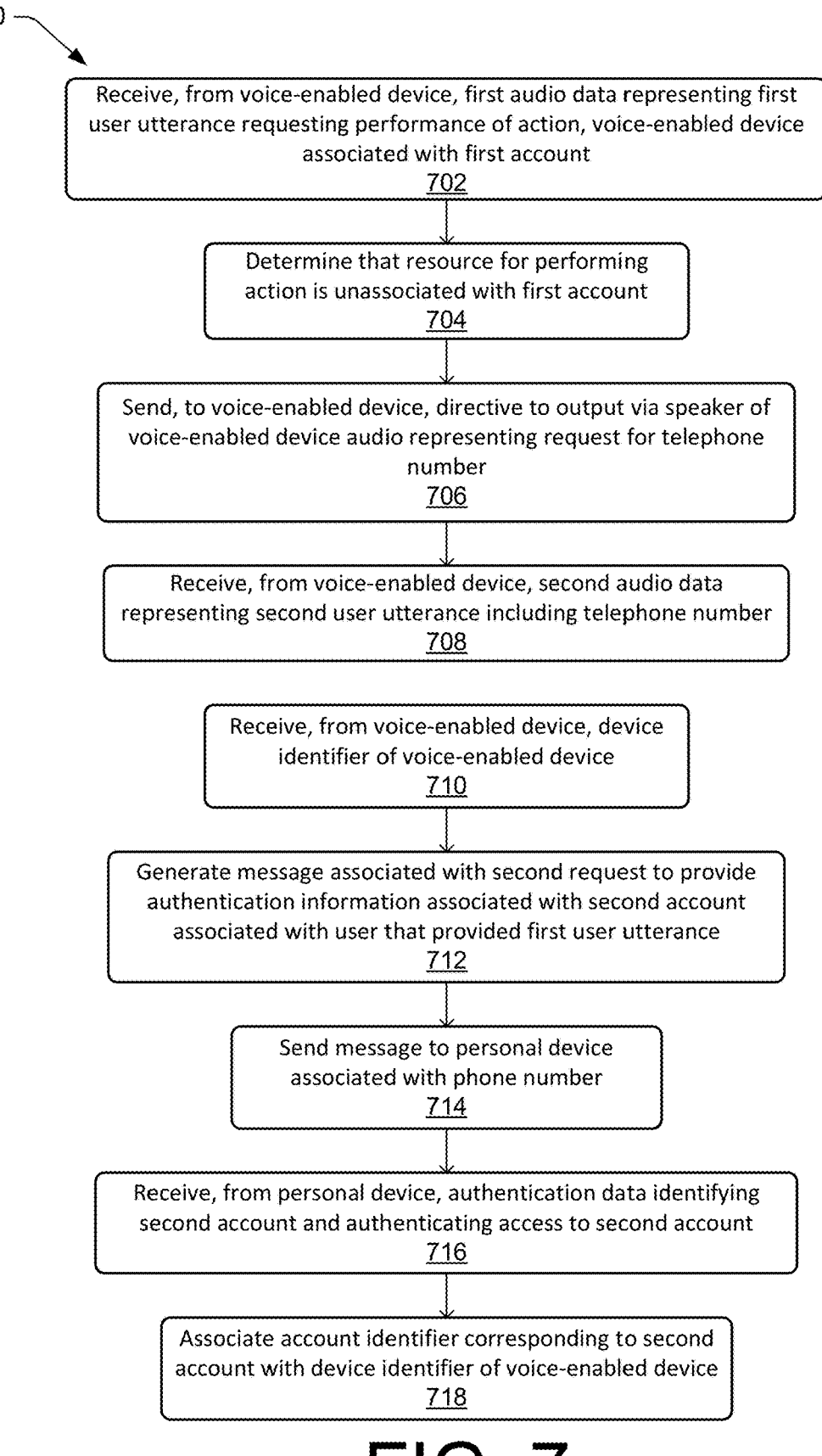

Receive, from voice-enabled device, first audio data representing first user utterance requesting performance of action, voice-enabled device associated with first account
702

Determine that resource for performing action is unassociated with first account
704

Send, to voice-enabled device, directive to output via speaker of voice-enabled device audio representing request for telephone number
706

Receive, from voice-enabled device, second audio data representing second user utterance including telephone number
708

Receive, from voice-enabled device, device identifier of voice-enabled device
710

Generate message associated with second request to provide authentication information associated with second account associated with user that provided first user utterance
712

Send message to personal device associated with phone number
714

Receive, from personal device, authentication data identifying second account and authenticating access to second account
716

Associate account identifier corresponding to second account with device identifier of voice-enabled device
718

FIG. 7

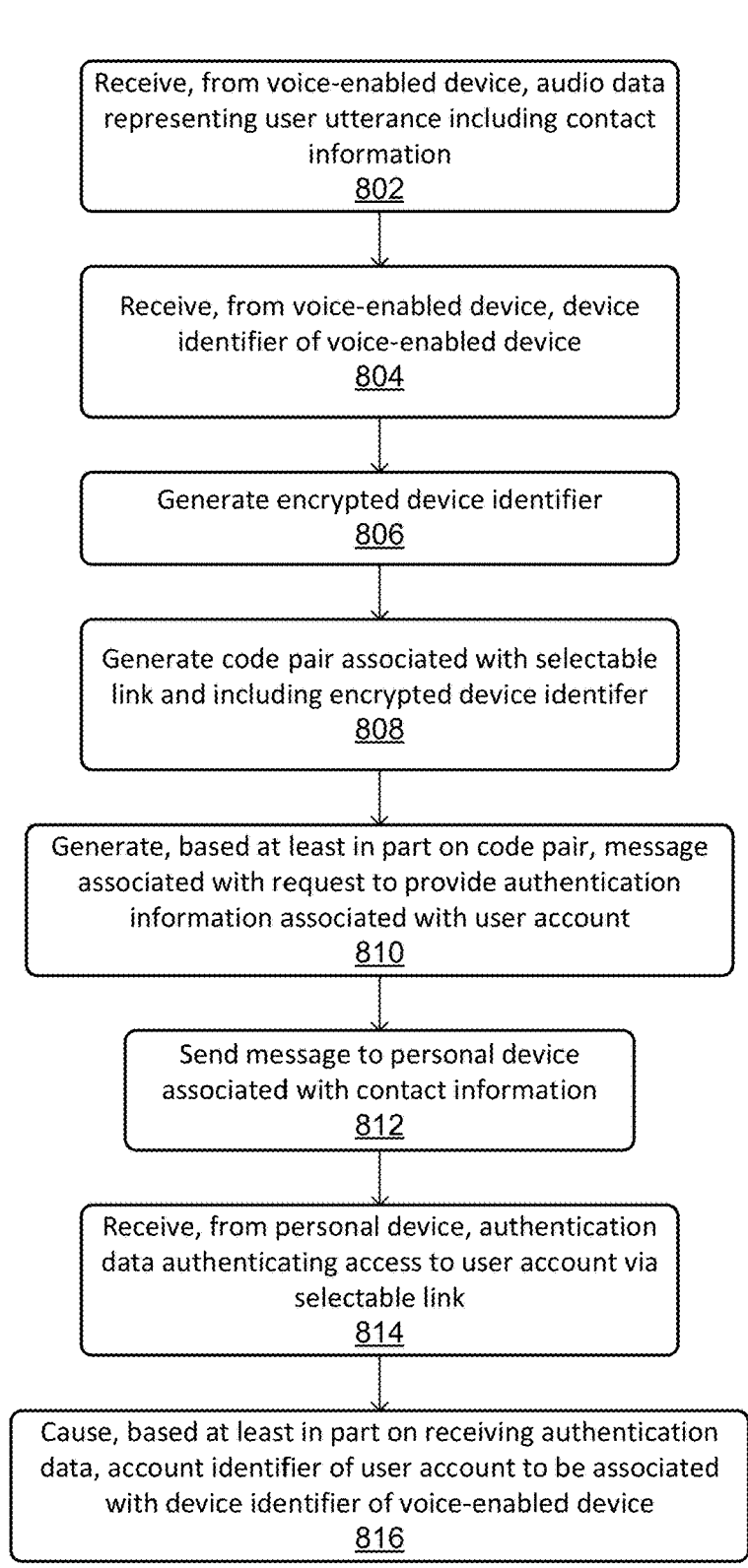

800

Receive, from voice-enabled device, audio data representing user utterance including contact information
802

Receive, from voice-enabled device, device identifier of voice-enabled device
804

Generate encrypted device identifier
806

Generate code pair associated with selectable link and including encrypted device identifer
808

Generate, based at least in part on code pair, message associated with request to provide authentication information associated with user account
810

Send message to personal device associated with contact information
812

Receive, from personal device, authentication data authenticating access to user account via selectable link
814

Cause, based at least in part on receiving authentication data, account identifier of user account to be associated with device identifier of voice-enabled device
816

FIG. 8

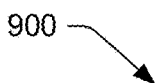

900

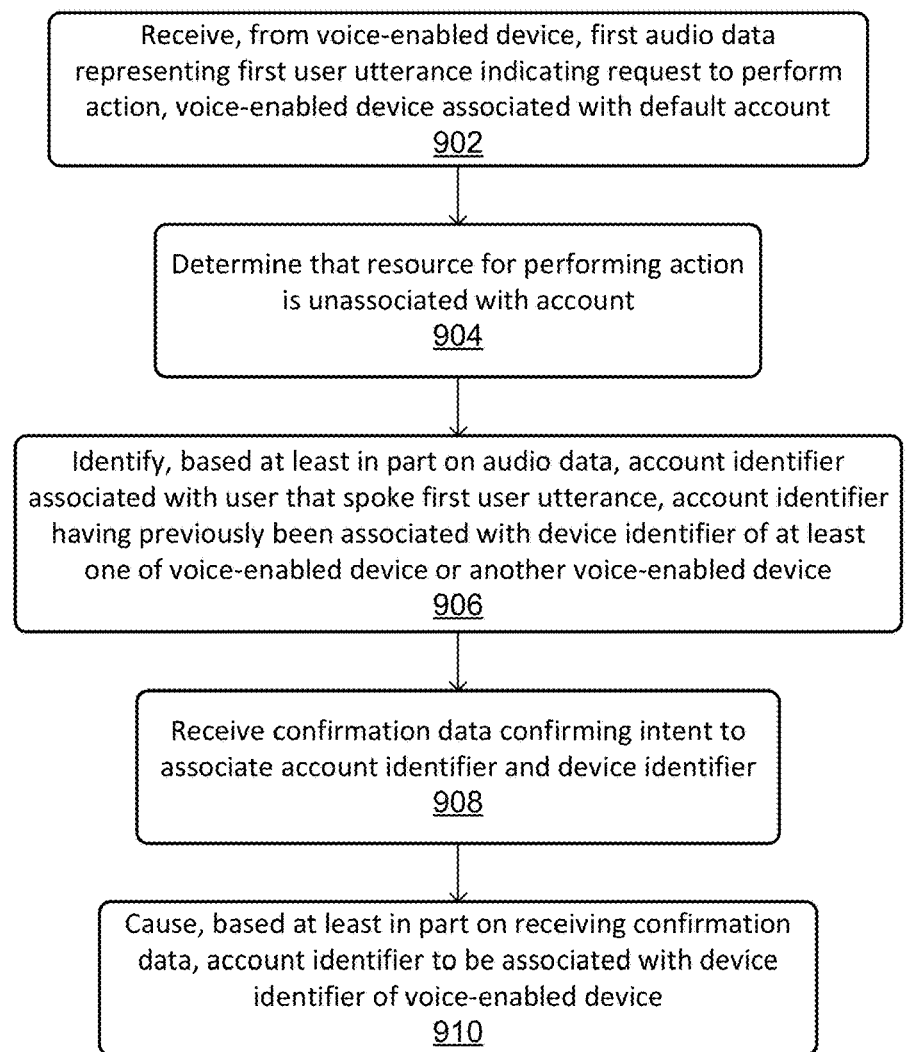

Receive, from voice-enabled device, first audio data representing first user utterance indicating request to perform action, voice-enabled device associated with default account
902

Determine that resource for performing action is unassociated with account
904

Identify, based at least in part on audio data, account identifier associated with user that spoke first user utterance, account identifier having previously been associated with device identifier of at least one of voice-enabled device or another voice-enabled device
906

Receive confirmation data confirming intent to associate account identifier and device identifier
908

Cause, based at least in part on receiving confirmation data, account identifier to be associated with device identifier of voice-enabled device
910

FIG. 9

1000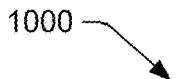

Receive first indication that temporary association between first account identifier of user account and device identifier of voice-enabled device associated with environment is established
1002

Determine that dissociation event associated with voice-enabled device has occurred, dissociation event representing at least one of lapsing of period of time identified for maintaining temporary association or receiving second indication of dissociation event from system associated with environment
1004

Dissociate first account identifier from device identifier based at least in part on determining that dissociation event has occurred
1006

Associate second account identifier corresponding to default account with device identifier
1008

FIG. 10

1100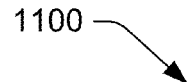

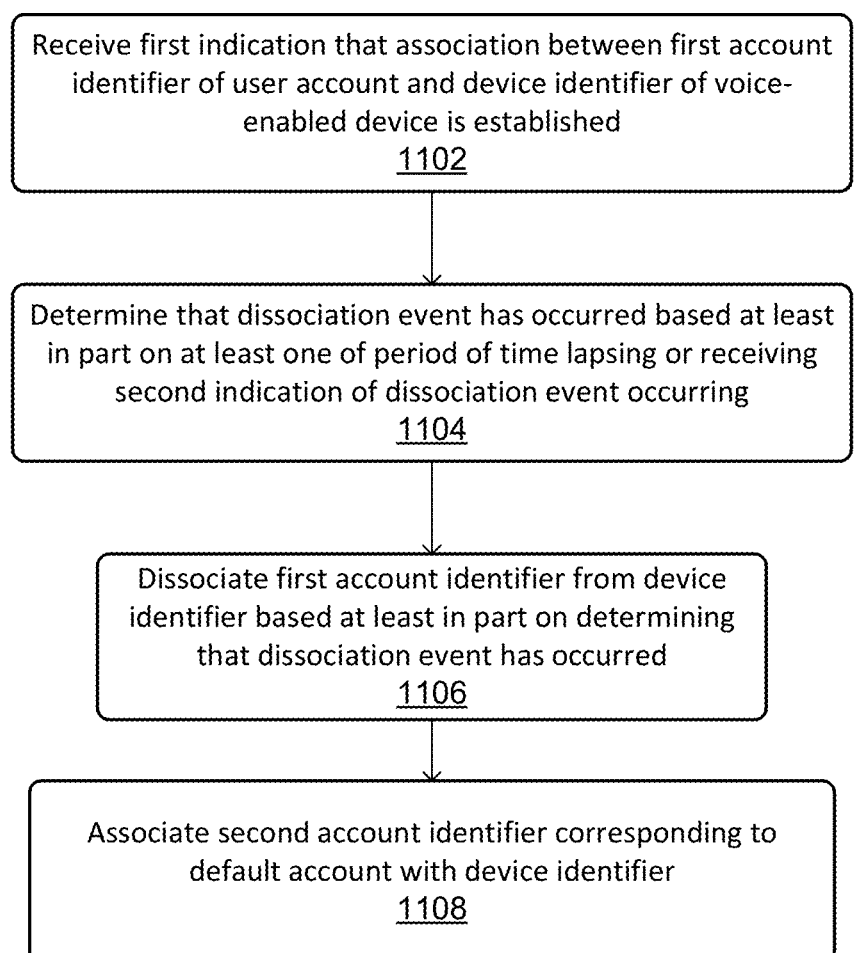

Receive first indication that association between first account
identifier of user account and device identifier of voice-
enabled device is established
1102

Determine that dissociation event has occurred based at least
in part on at least one of period of time lapsing or receiving
second indication of dissociation event occurring
1104

Dissociate first account identifier from device
identifier based at least in part on determining
that dissociation event has occurred
1106

Associate second account identifier corresponding to
default account with device identifier
1108

FIG. 11

TEMPORARY ACCOUNT ASSOCIATION WITH VOICE-ENABLED DEVICES

RELATED APPLICATIONS

This application claims priority to and is a continuation of U.S. patent application Ser. No. 17/098,805, filed on Nov. 16, 2020, which claims priority to and is a continuation of U.S. patent application Ser. No. 16/001,763, filed on Jun. 6, 2018, now known as U.S. Pat. No. 10,847,153, which issued on Nov. 24, 2020, the entire contents of which are incorporated herein by reference.

BACKGROUND

Voice-enabled devices are currently used in homes. Additional uses for voice-enabled devices may be desired. Described herein are improvements in technology and solutions to technical problems that can be used to, among other things, increase the availability of voice-enabled devices for users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example process for utilizing a voice-enabled device that has been temporarily associated with an account.

FIG. 7 illustrates a flow diagram of an example process for temporary account association with voice-enabled devices.

FIG. 8 illustrates a flow diagram of another example process for temporary account association with voice-enabled devices.

FIG. 9 illustrates a flow diagram of another example process for temporary account association with voice-enabled devices.

FIG. 10 illustrates a flow diagram of an example process for dissociating an account from voice-enabled devices.

FIG. 11 illustrates a flow diagram of another example process for dissociating an account from voice-enabled devices.

DETAILED DESCRIPTION

Figure 1A:
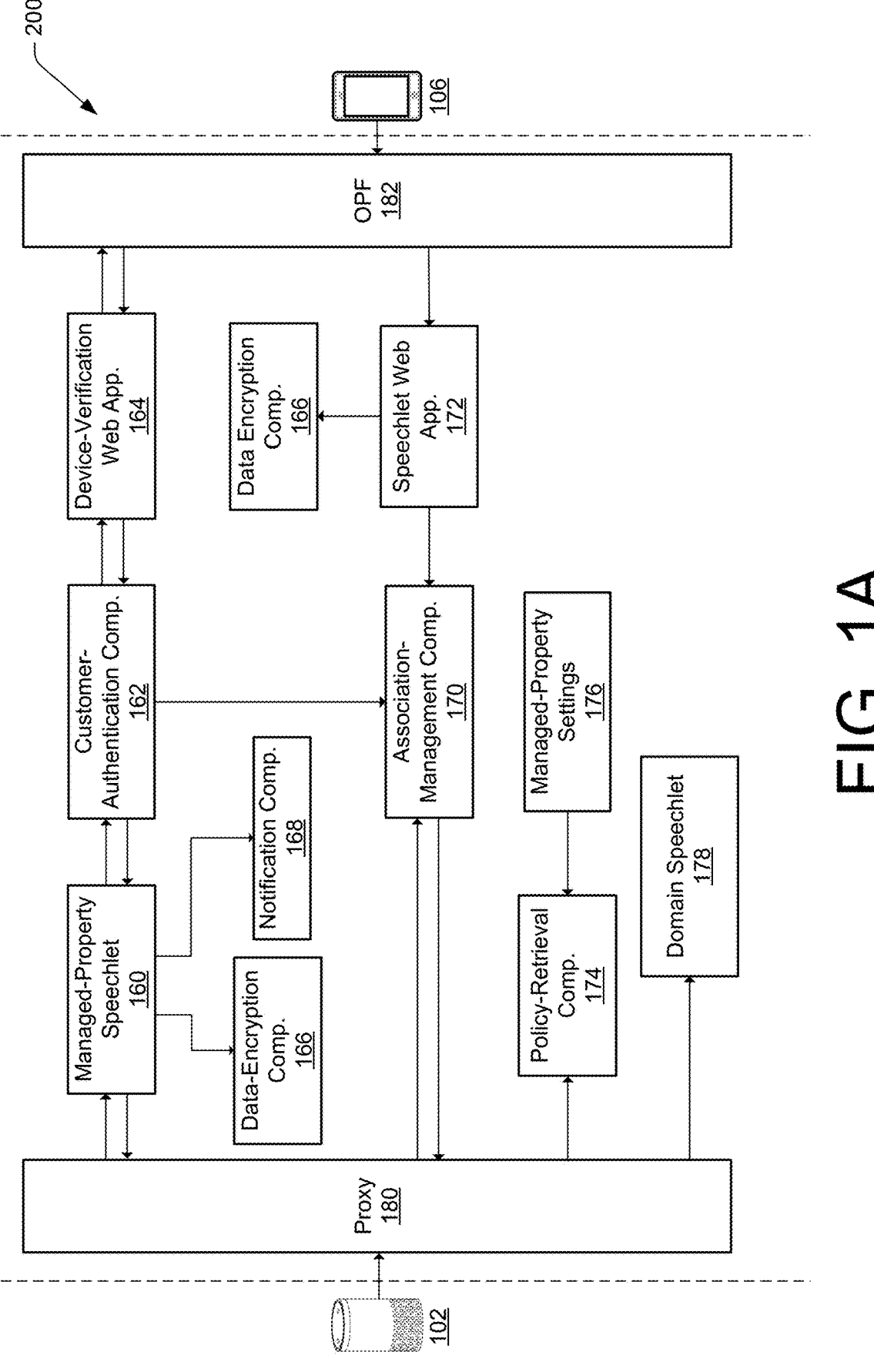
FIG. 1A illustrates a schematic diagram of an example environment for temporary account association with voice-enabled devices.

Systems and methods for establishing temporary account associations with voice-enabled devices are described herein. Take, for example, a hotel or other environment where users may reside temporarily. The hotel may include a number of rooms and/or suites, and some or all of these rooms may have situated therein one or more voice-enabled devices. The voice-enabled devices may be any device that may capture audio, such as from a person speaking, generate corresponding audio data to be processed, and either perform an action associated with the audio and/or confirm that an action has been performed by another device and/or system. Such devices may include, for example, voice-assistant devices, televisions, door and/or window locks, light bulbs, clocks, alarms, phones, kitchen appliances, etc. The voice-enabled devices of the hotel may be associated with one or more user accounts associated with the hotel.

When a guest is present in a hotel room, the guest may desire to interact with the voice-enabled device, such as by saying "what's the weather like outside," "play Song A," "turn the lights off," "order a pizza," "purchase Product A," etc. Microphones of the voice-enabled device may capture audio representing the user utterance and may generate corresponding audio data to be sent to, for example, a remote system. The remote system may determine an intent, such as by generation of intent data, corresponding to the user utterance. For example, the intent may be to output audio indicating the weather at and/or around the location of the voce-enabled device, output audio corresponding to Song A, cause light bulbs located in the hotel room to cease emitting light, etc.

In some examples, the user account of the hotel, which may be described as the default user account, may have access to and/or permission to utilize one or more resources to perform an action associated with the intent. For example, the default user account may have access to a weather application. In other examples, the default user account may not have access to and/or permission to utilize resources to perform the action. For example, the default user account may not have access to a music resource to output a requested song, or access to resources representing payment instruments to purchase a product or order a pizza. In these examples, the default user account of the hotel may not be utilized to perform the action requested by a user.

To enhance the experience of using a voice-enabled device in a hotel or other environment where users reside temporarily, the present innovation may utilize techniques to establish a temporary association between a personal user account and the voice-enabled device. For example, audio data representing a user utterance may be received, such as by a remote system, and may be analyzed to determine that a resource to be utilized to effectuate an intent associated with the user utterance is not accessible and/or the default account associated with the voice-enabled device is not authorized to access the resource. In these examples, directive data may be generated by the remote system and may be sent to the voice-enabled device. The directive data may cause the voice-enabled device to output, such as via one or more speakers of the voice-enabled device, a request for information to establish a temporary association between a personal user account associated with the user and the voice-enabled device. The request may represent a request for contact information associated with the personal user account. The contact information may be, for example, a phone number associated with the personal user account, and/or other contact information such as an email address and/or a social media account identifier.

The user may then provide another user utterance to the voice-enabled device that includes the contact information. The audio representing the user utterance may be captured by microphones of the voice-enabled device and corresponding audio data may be generated and sent, for example, to a remote system. The remote system may perform automatic speech recognition on the audio data to generate corresponding text data representing the user utterance. The text data may include a textual representation of the contact information provided by the user. The remote system may utilize the contact information to send, to a personal device associated with the contact information, a message to be utilized to temporarily associate the personal user account with the voice-enabled device. By way of example, the message may be a short message service (SMS) message that includes a selectable portion, such as a webpage link, that when selected by the user of the personal device, may allow for receipt of account access information, such as a username and/or password associated with the personal user account.

In some examples, the selectable portion, when selected, may cause a website application, such as a website access and/or browsing application, to open and display a webpage that allows the user to input the account access information. In other examples, the selectable portion of the message, when selected, may cause an application associated with the user account, such as a companion application, to be accessed. The companion application may have access to the account access information and may be utilized to acquire the account access information without the user inputting that information into, for example, a website application. Data corresponding to the account access information may be received from the personal device and utilized by the remote system to determine which user account to associate with the voice-enabled device. The remote system may then temporarily associate the user account with a device identifier associated with the voice-enabled device.

Once the user account is associated with the voice-enabled device, subsequent user utterances may be captured by microphones of the voice-enabled device and corresponding audio data may be generated and sent to the remote system for processing. An intent associated with such a user utterance may be determined and resources associated with the active account may be utilized to perform one or more actions associated with the intent, such as playing a specific song, ordering a product, requesting personal account information, performing one or more implicit actions based on the user utterance, etc.

Additionally, or alternatively, the present innovation may provide techniques to dissociate a user account from a voice-enabled device, such as in situations where the voice-enabled device is situated in an environment where users temporarily reside. Utilizing the example provided above, upon the user inputting the account access information, and/or upon the user account being associated with the voice-enabled device, the website application, or another application, may be caused to display one or more fields that may allow a user of the personal device to input checkout information. For example, the user may be prompted to indicate the checkout date and/or the checkout time for the user's stay at a hotel. This information may be utilized to determine a period of time to maintain the association between the user account and the voice-enabled device.

Additionally, or alternatively, the period of time may be based on data received from one or more systems associated with the environment, such as room-scheduling data. Additionally, or alternatively, the period of time may be based at least in part on the occurrence of a dissociation event, which may be, for example, an indication that the user has checked out of the environment, receiving a user request to dissociate the account, and/or receiving an indication that the user has temporarily left the residence during the period of time. By so doing, user accounts may be temporarily associated with voice-enabled devices when requested and/or desired and may be dissociated to prevent the unintended use of personal account resources and information by others.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1A illustrates a schematic diagram of an example system 100 for establishing temporary account associations with voice-enabled devices. The system 100 may include, for example, one or more voice-enabled devices 102, which may be situated in one or more rooms and/or suites associated with an environment that a person may reside in temporarily. The system may additionally include a personal device 106, which may be a device associated with a user located within the environment. The system 100 may additionally include one or more components that may be remote from the voice-enabled device 102 and/or the personal device 106. Those components may include, for example, a managed-property speechlet 160, a customer-authentication component 162, a device-verification web application 164, a data-encryption component 166, a notification component 168, an association-management component 170, a speechlet web application 172, a policy-retrieval component 174, one or more managed-property settings 176, one or more domain speechlets 178, a proxy 180, and an OPF 182. Each of these components will be described in detail below by way of one or more examples.

To illustrate, audio data may be generated via one or more microphones associated with the voice-enabled device 102. The audio data may correspond to a user utterance to explicitly or implicitly perform an action. The audio data may be received by a remote system associated with the voice-enabled device 102, where automatic speech recognition and/or natural language understanding techniques may be utilized to determine an intent to perform the action. The remote system may determine that a resource to be utilized to perform the action is not available to a default user account associated with the voice-enabled device. For example, the user utterance may be "purchase Chinese food for delivery," and a resource and/or domain speechlet to effectuate the intent of ordering Chinese food for delivery may not be available to a default user account associated with the voice-enabled device 102. In these examples, it may be desirable to temporarily associate a user account of the user with the voice-enabled device 102, such as when the user account is associated with a resource to be used to effectuate a given intent.

In these examples, audio may be output via speakers of the voice-enabled device 102. The audio may represent a request for contact information to begin the process of temporarily associating a user account with a device identifier of the voice-enabled device 102. Microphones of the voice-enabled device 102 may capture audio corresponding to a user utterance representing the contact information and may generate corresponding audio data. That audio data may be processed using ASR and/or NLU techniques. The managed-property speechlet 160 may receive intent data indicating an intent to initiate temporary account association based at least in part on the provided contact information. A request to "seal" or otherwise encrypt a device identifier associated with the voice-enabled device 102 may be sent to the data-encryption component 166, which may seal or otherwise encrypt the device identifier. Data representing the encrypted device identifier may be received by the managed-property speechlet 160.

The managed-property speechlet 160 may additionally, in examples, request a code pair from the customer-authentication component 162. The code pair may include and/or represent a uniform resource locator (URL) for dissociation information input and/or the sealed device identifier. The managed-property speechlet 160 may receive the code pair and may send the code pair, device identifier, and contact information to the notification component 168. The notification component 168 may identify, determine, and/or generate a message that may include a URL link and/or other selectable portion. The message may be sent to the personal device 106.

A display of the personal device 106 may display the link and/or other selectable portion. Upon selection of the link and/or other selectable portion, the speechlet web application 172 may be initiated and may cause a website to be displayed to provide authentication information associated with the user account to be temporarily associated. Additionally, or alternatively, the website may allow a user to provide information indicating when the temporary association between the user account and the device identifier should be terminated. In examples, the speechlet web application 172 may call the data-encryption component 166 to unseal and/or decrypt the device identifier associated with the voice-enabled device 102.

The speechlet web application 172 may provide the user account identifier and/or dissociation information to the association-management component 170. The customer-authentication component 162 may provide the device identifier to the association-management component 170. Utilizing the user account identifier and the device identifier, the association-management component 170 may associate the user account and the device identifier. For example, when subsequent audio data is received by the system 100, that audio data may include data indicating the device identifier associated with the voice-enabled device 102. The association-management component 170 may be utilized to identify and/or determine which user account is associated with the device identifier for a given period of time. If the user account is associated with the device identifier, the association-management component 170 may provide such an indication to other components of the system 100, which may indicate which domain speechlets 178 and/or resources may be utilized to perform an action associated with the user utterances.

Additionally, or alternatively, in examples, an application associated with the voice-enabled device 102 may be installed on the personal device 106. In these examples, the device-verification web application 164 may verify the device identifier associated with the application and may extract or otherwise receive user account credentials from the personal device 106, such as without the user entering such credentials. This information may be utilized by the association-management component 170 to associate the user account with the device identifier.

The one or more domain speechlets 178 associated with the user account, otherwise described as "whitelisted" domain speechlets 178 may be identified and/or determined. These domain speechlets 178 may be utilized to handle audio data representing user utterances while the user account is associated with the device identifier of the voice-enabled device 102. Additionally, or alternatively, the managed-property settings 176 may be received from one or more devices associated with the managed property. These settings 176 may include enablement or disablement of temporary account association, indications of which domain speechlets 178 are permitted, one or more rules for associating and/or dissociating device identifiers from user accounts, etc. The policy-retrieval component 174 may receive the settings 176 and may utilize those settings to access domain speechlets 178 and/or handle requests to temporarily associate user accounts with device identifiers.

Data and/or instructions may be sent between the components described in FIG. 1A and the voice-enabled device via the proxy 180, which may format the data and/or utilize one or more application programming interfaces (APIs) to facilitate communication. Likewise, data and/or instructions may be sent between the components described in FIG. 1A and the personal device 106 via the OPF 182, which may format the data and/or utilize one or more APIs to facilitate communication.

Figure 1B:
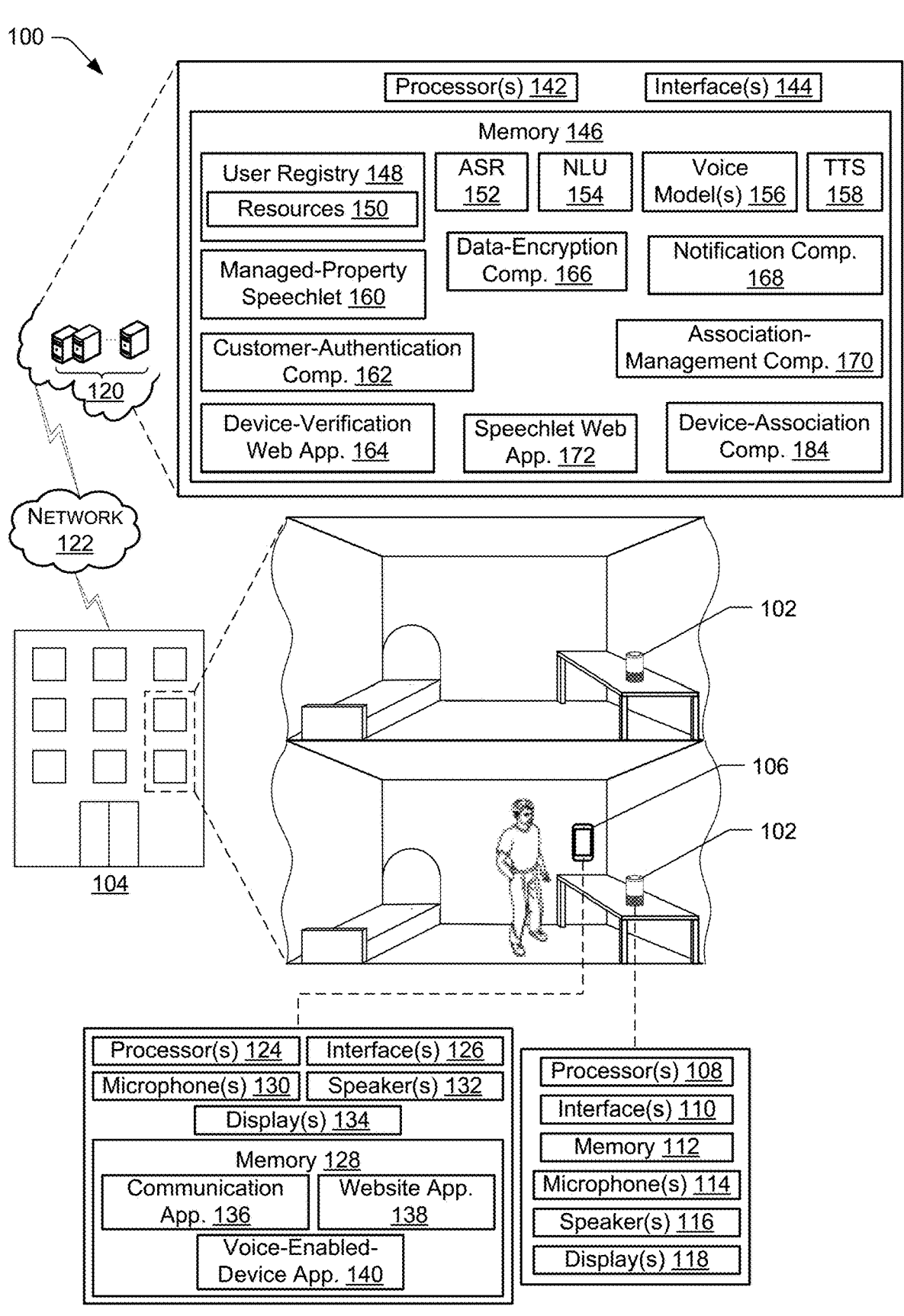
FIG. 1B illustrates additional details of the schematic diagram of FIG. 1A showing an example environment for temporary account association with voice-enabled devices.

FIG. 1B illustrates a schematic diagram of addition components of example system 100 for establishing temporary account associations with voice-enabled devices. The system 100 may include, for example, one or more voice-enabled devices 102, which may be situated in one or more rooms and/or suites associated with an environment 104, such as, for example, a hotel, a wedding venue, a study room, a classroom, an automobile, and/or any other room or group of rooms that a person may reside in temporarily. The system 100 may additionally include a personal device 106, which may be a device associated with a user located within the environment 104. The personal device 106 may be, for example, a mobile phone, a personal-assistant device, a laptop computer, a tablet, a watch, and/or any other electronic device capable of sending and receiving information.

The voice-enabled device 102 may include components such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as in response to receiving audio data and/or directive data from a remote system 120 via a network 122. The displays 118 may be configured to visually present information to a user.

The personal device 106 may include components such as, for example, one or more processors 124, one or more network interfaces 126, memory 128, one or more microphones 130, one or more speakers 132, and/or one or more displays 134. The microphones 130, speakers 132, and/or displays 134 may operate in the same or a similar manner as the microphones 114, speakers 116, and/or displays 118 of the voice-enabled device 102. The memory 128 of the personal device 106 may include one or more components, such as, for example, a message application 136, a website application 138, and/or a voice-enabled-device application 140. Each of these components will be described in detail below along with the components of the remote system 120.

The remote system 120 may be configured to receive and send data between the remote system 120, the voice-enabled device 102, and/or the personal device 106, for example. The remote system 120 may include components such as, for example, one or more processors 142, one or more network interfaces 144, and memory 146. The components of the memory 146 may include, for example, a user registry 148, which may include one or more resources 150, an automatic speech recognition (ASR) component 152, a natural language understanding (NLU) component 154, one or more voice models 156, a text-to-speech (TTS) component 158, a device-association component 174, and/or one or more components described with respect to FIG. 1A. It should be understood that while FIG. 1B depicts the remote system 120 has including memory 146 with each of the components described herein, the remote system 120 may describe multiple systems with one or more memories. Each of the components described herein with respect to the remote system 120 may be associated with their own systems, and/or some or all of the components may be associated with a single system. The components of the memory 146 are described in detail below.

The user registry component 148 may be configured to identify, determine, and/or generate associations between users, user profiles, user accounts, and/or devices. For example, one or more associations between user profiles and user accounts may be identified, determined, and/or generated by the user registry 148. The user registry 148 may additionally store information indicating one or more applications and/or resources 150 accessible to and/or enabled for a given user profile and/or user account. It should also be understood that a user account may be associated with one or more than one user profiles. It should also be understood that the terms "user account" and/or "user profile" may be used to describe a set of data and/or functionalities associated with a given account identifier and/or profile identifier. For example, data identified, determined, and/or generated while using some or all of the system 100 may be stored or otherwise associated with an account identifier and/or profile identifier. Data associated with the user accounts and/or profiles may include, for example, account/profile access information, historical usage data, device-association data, and/or preference data. Additionally, as described herein, the resources 150 and/or domain speechlets 168 may include one or more applications, skills, abilities, functionalities, and/or capabilities of the remote system 120 and/or one or more other devices and/or systems that have been authorized and/or are otherwise available to be used when audio data representing a user utterance is received that is associated with the given account identifier and/or profile identifier. Some nonlimiting examples of resources 150 may include functionalities associated with playing music, accessing playlists and/or audio file databases, shopping, controlling accessory devices such as a light bulbs and/or locks, accessing contact information associated with contacts, and/or sending and/or receiving messages.

The ASR component 152 may be configured to receive audio data, which may represent human speech such as user utterances, and generate text data corresponding to the audio data. The text data may include words corresponding to the human speech. The NLU component 154 may be configured to determine one or more intents associated with the human speech based at least in part on the text data. The ASR component 152 and the NLU component 154 are described in more detail below with respect to FIG. 12. For purposes of illustration, the ASR component 152 and the NLU component 154 may be utilized to determine one or more intents to perform an action that utilizes one or more of the resources 150 and/or an intent to temporarily associate a user account with a voice-enabled device 102.

For example, a user may speak a user utterance to the voice-enabled device 102. The microphones 114 of the voice-enabled device 102 may capture the user utterance and may generate corresponding audio data. The audio data may be sent, via the network 122, to the remote system 120. The ASR component 152 may process the audio data and generate corresponding text data. The NLU component 154 may utilize the text data to determine intent data representing an intent of the user to, in these examples, perform an action that utilizes one or more of the resources 150 and/or an intent to temporarily associate a user account with a voice-enabled device 102. For example, the user utterance may be "play Song A." The remote system 120, utilizing the NLU component 154, may determine that a resource 150 is not available to perform the action of outputting audio corresponding to Song A. For example, the voice-enabled device 102 may be associated with a default user account associated with the environment 104. That default user account may not have access to a resource 150 to output Song A. By way of example, the default user account may not be associated with a music service and/or database that permits playing Song A. In these examples, a speechlet 160 of the remote system 120 may be utilized to start the process of temporarily associating a personal user account associated with the user with the voice-enabled device.

The speechlet 160 may receive the intent data from the NLU component 154 and may utilize the intent data to identify, determine, and/or generate directive data corresponding to the intent data. For example, the speechlet 160 may be called and utilized to generate directive data that, when sent to and utilized by the voice-enabled device 102, causes output of audio, such as via the speakers 116, representing a request for information to temporarily associate a user account with the voice-enabled device 102. The TTS component 158 may be utilized to generate audio data to be utilized by the voice-enabled device 102 to output the audio as directed by the directive data generated by the speechlet 160. For example, the output audio may be "we can't perform that operation, please provide your phone number to link your account to this device." The example audio provided above is provided by way of illustration only and not as a limitation. In should be understood that while the example of contact information is provided as a phone number, the contact information may additionally, or alternatively, include an email address and/or a social media account identifier, for example.

The speechlets 160 described herein may include a speech-enabled web component that may run in the remote system 120. Speechlets 160 may receive and respond to speech-initiated requests. Speechlets 160 may define life-cycle events for a skill as experienced by a user, a way to process speech requests from the user, and/or call-backs from events happening on the device the user is interacting with. Given speechlets may be capable of handling certain intents. For example, the NLU component 154 may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

The user may then speak a second user utterance that includes the requested contact information, which in this example is a phone number. The microphones 114 of the voice-enabled device 102 may capture audio corresponding to the second user utterance and may generate corresponding audio data. The audio data may be sent to the remote system 120, where the ASR component 152 may generate corresponding text data representing the contact information.

The text data may be provided to the notification component 168, which may be configured to identify, determine, and/or generate a message to be sent to the personal device 106 associated with the contact information. In examples, the message may be a SMS message. In other examples, the message may be an email, a telephone call, a social media message, such as a direct message, or another form of message that can be received by the personal device 106.

The notification component 168 may generate the message and/or a portion thereof. For example, a selectable portion associated with the message, such as a webpage link, that when selected may assist in gathering account access information, such as a username and/or password associated with the personal user account. The notification component 168 may additionally, or alternatively, utilize the customer-authentication component 162 to generate a code pair that associates a device identifier associated with the voice-enabled device 102, the contact information provided by the user, and/or the selectable portion of the message. The data-encryption component 166 may be utilized to encrypt the device identifier, contact information, and/or the message. The notification component 168 of the remote system 120 may be utilized to send the message to the personal device 106, where the message application 136 of the personal device 106 may be utilized to receive and/or display the message.

In some examples, the selectable portion, when selected, may cause the website application 138 of the memory 128 of the personal device 106, such as a website access and/or browsing application, to open and display a webpage that allows the user to input the account access information. In other examples, the selectable portion of the message, when selected, may cause the voice-enabled-device application 140 associated with the user account, such as a companion application, to be accessed. The voice-enabled-device application 140 may have access to the account access information and may be utilized to acquire the account access information without the user inputting that information into, for example, a website application 138. Data corresponding to the account access information may be received by the remote system 120 and from the personal device 106 and may be utilized by the remote system 120 to determine which user account to associate with the voice-enabled device 102.

The notification component 168 may also be configured to send one or more messages associated with association and/or dissociation of the user account from the voice-enabled device 102. For example, a message may be sent to the personal device 106 that causes and/or allows the website application 138 to display a webpage that allows a user of the personal device 106 to input information associated with their stay at the environment 104. This information may include, for example, a checkout time and/or a checkout day, from the environment 104. This information may be utilized to determine a period of time during which the association between the user account and the voice-enabled device 102 is to be maintained, and/or when the user account should be dissociated from the voice-enabled device 102. By providing this functionality, the user is able to control when potentially-personal information and/or capabilities associated with user accounts are available to the voice-enabled device 102 and when that information and those capabilities should not be available.

The notification component 168, and/or other components of the remote system 120, may additionally, or alternatively, be configured to request scheduling data from one or more devices and/or systems associated with the environment 104. The scheduling data may indicate the period of time that a user is staying at the environment, which may be utilized to identify and/or determine the period of time to maintain the association between the user account and the voice-enabled device 102.

The association-management component 170 may be configured to identify and/or determine the association between the user account and the voice-enabled device 102. For example, upon receiving additional audio data from the voice-enabled device 102, the association-management component 170 may be utilized to determine that the user account is actively associated with the device identifier associated with the voice-enabled device 102. This information may be utilized to determine how to process the audio data and/or which resources 150 may be utilized to perform one or more actions associated with the audio data.

The association-management component 170 may additionally, or alternatively, be configured to store data associated with the period of time that the account is to be associated with the voice-enabled device 102. The association-management component 170 may additionally, or alternatively, be configured to store dissociation-event data indicating one or more dissociation events that, when one of the dissociation events occurs, causes the user account to be dissociated with the voice-enabled device 102. The dissociation events may include receiving an indication that the user has checking out from the environment 104. Additionally, or alternatively, the remote system 120 may receive additional audio data representing another user utterance, and the remote system 120 may determine that an intent associated with the user utterance is to dissociate the user account from the voice-enabled device 102. Receipt of this audio data and/or determining that the user utterance corresponds to an intent to dissociate may be considered a dissociation event. The dissociation events may also include temporary dissociation events. For example, the voice-enabled device 102 and/or the remote system 120 may be configured to receive an indication that a lock and/or keycard reader associated with the environment has been utilized to leave a room. Based at least in part on this indication, the association-management component 170 may be configured to temporarily dissociate the user account from the voice-enabled device 102, such as until the lock and/or keycard reader indicates the user has entered the room.

The association-management component 170 may additionally be configured to determine when one or more events occur that cause the period of time to maintain the association between the user account and the voice-enabled device 102 to change. For example, the remote system 120 may receive an indication that the period of time is to be increased or decreased. By way of example, a user may decide to check out early from a hotel and/or the user may decide to extend his or her stay. In other examples, the indication that the period of time has been increased or decreased may be received from a system associated with the environment. An indication of such an event may be sent to and received by the remote system 120 and may be utilized to identify, determine, and/or generate a second period of time to maintain the association between the user account and the voice-enabled device 102.

The device-association component 184 may be configured to identify, determine, generate, and/or store device-association data indicating associations between the voice-enabled device 102 and one or more other devices within the environment 104. For example, the environment 104 may include one or more "smart," accessory devices configured to communicate with the voice-enabled device 102. Examples of such accessory devices may include light bulbs, televisions, plugs, outlets, locks, and/or appliances. The device-association component 184 may be configured to store device-association data indicating which of these accessory devices are associated with the voice-enabled device 102. In examples, once a user account is associated with the voice-enabled device 102, the user may be able to provide user utterances to control functionality of the accessory devices, such as via the voice-enabled device 102.

Additionally, or alternatively, in examples, the user may visit the same or another environment 104 that has the same voice-enabled device 102 and/or another voice-enabled device 102. This repeat visitor may desire to re-establish an association between the user account associated with the user and the voice-enabled device 102. An account may be re-established in one or more of multiple ways. For example, the user may provide a user utterance that is captured by microphones of the voice-enabled device 102. Corresponding audio data may be generated and sent to the remote system 120 for processing. Upon determining that a resource to be utilized to perform an action associated with the user utterance is not available to a default account associated with the voice-enabled device 102, audio may be output by the voice-enabled device 102 requesting the user to provide contact information to start the process of associating a personal account of the user with the voice-enabled device 102. The user may provide the contact information, such as a phone number.

The provided phone number may be cross-referenced with phone numbers that have been previously provided to associate accounts with voice-enabled devices 102. In this example, given that the account had been previously associated with a voice-enabled device 102 utilizing the contact information, the remote system 120 may identify the account associated with the contact information without sending a message to the personal device 106 of the user and/or without requiring the user to input account identifying information. In these examples, a message or other notification may be sent to the personal device 106 and/or the voice-enabled device 102 indicating that the account has been associated with the voice-enabled device 102. By so doing, if an account was mistakenly or nefariously associated with a voice-enabled device 102, the user associated with that account may be notified so that corrective action may be taken.

Additionally, or alternatively, repeat visitors may associate an account with a voice-enabled device 102 utilizing one or more voice models 156. The voice models 156 may include, for example, one or more reference voice signatures. The reference voice signatures may indicate characteristics associated with audio data, such as amplitudes and/or frequencies corresponding to the audio data. Additionally, or alternatively, reference voice signatures may be identified, determined, and/or generated utilizing frequency estimation, hidden Markov models, Gaussian mixture models, pattern matching algorithms, neural networks, matrix representations, and/or Vector Quantization. A user may provide a user utterance, which may be captured by microphones of the voice-enabled device 102. Corresponding audio data may be generated and sent to the remote system 120. The user may be identified based at least in part on a voice model 156. Identification of the user may include, for example, determining that a voice signature of the audio data matches or most closely matches a reference voice signature of the reference voice signatures stored and/or accessed by the voice model 156. A user identifier associated with the user may be associated with the user account. The remote system 120, having received identification of the user account and a device identifier associated with the voice-enabled device 102 from which the audio data was received, may then temporarily associate the user account with the voice-enabled device 102. In these examples, a message or other notification may be sent to the personal device 106 and/or the voice-enabled device 102 indicating that the account has been associated with the voice-enabled device 102. By so doing, if an account was mistakenly or nefariously associated with a voice-enabled device 102, the user associated with that account may be notified so that corrective action may be taken.

As used herein, a processor, such as processor(s) 108, 124, and/or 142, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108, 124, and/or 142 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108, 124, and/or 142 may possess its own local memory, which also may store program components, program data, and/or one or more operating systems.

The memory 112, 128, and/or 146 may include volatile and nonvolatile memory, removable and non-removable media implemented in any method or technology for storage of information, such as computer-readable instructions, data structures, program component, or other data. Such memory 112, 128, and/or 146 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112, 128, and/or 146 may be implemented as computer-readable storage media ("CRSM"), which may be any available physical media accessible by the processor(s) 108, 124, and/or 142 to execute instructions stored on the memory 112, 128, and/or 146. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112, 128, and/or 146, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110, 126, and/or 144 may enable messages between the components and/or devices shown in system 100 and/or with one or more other remote systems, as well as other networked devices. Such network interface(s) 110, 126, and/or 144 may include one or more network interface controllers (NICs) or other types of transceiver devices to send and receive messages over the network 122.

For instance, each of the network interface(s) 110, 126, and/or 144 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110, 126, and/or 144 may include a wide area network (WAN) component to enable message over a wide area network.

In some instances, the remote system 120 may be local to an environment associated the voice-enabled device 102. For instance, the remote system 120 may be located within the voice-enabled device 102. In some instances, some or all of the functionality of the remote system 120 may be performed by the voice-enabled device 102.

FIGS. 2-5 illustrate various processes for establishing temporary account associations with voice-enabled devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1A, 1B, 6, 12, and 13, although the processes may be implemented in a wide variety of other environments, architectures and systems.

Figure 2:
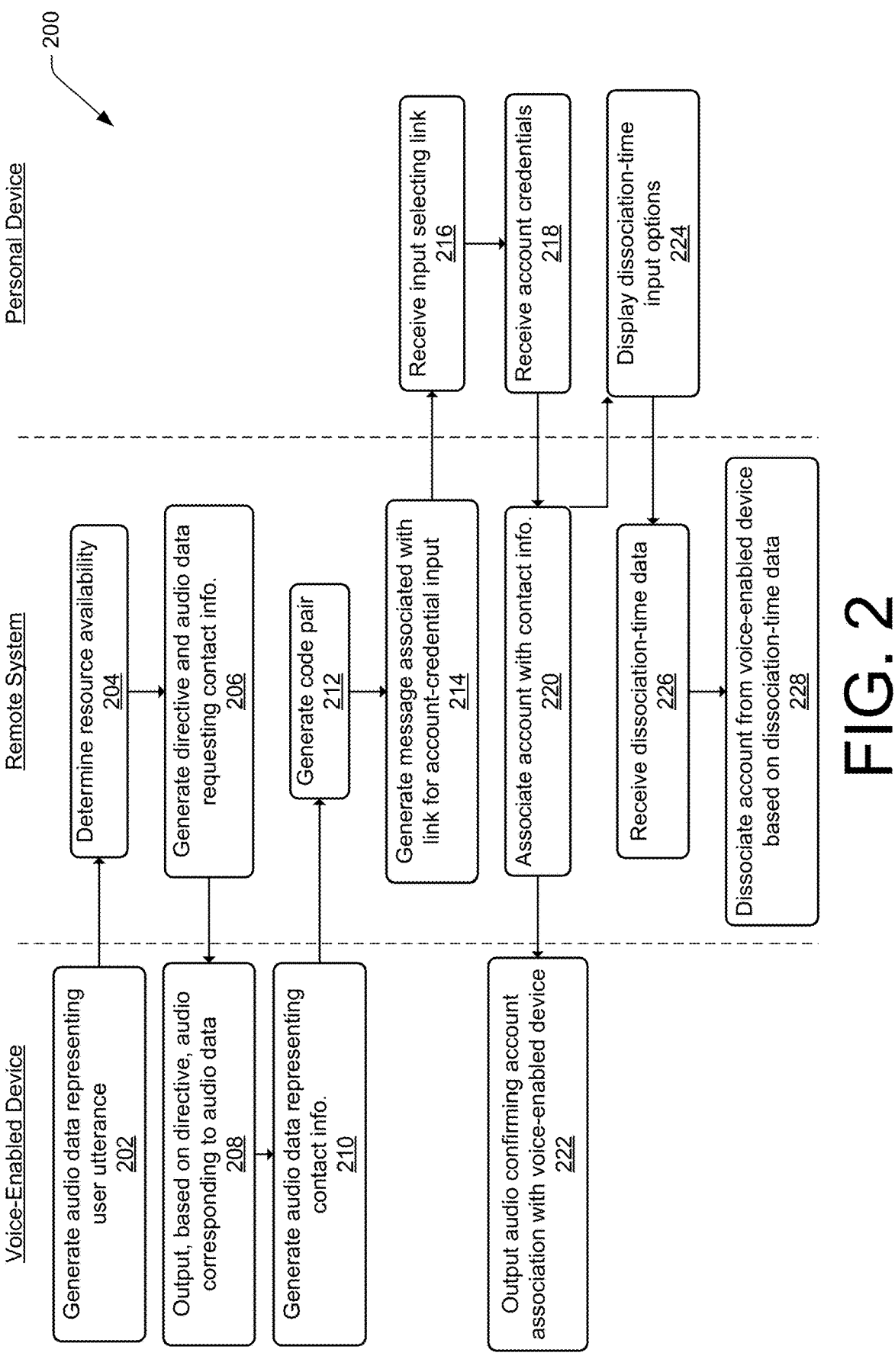
FIG. 2 illustrates a flow diagram of an example process for temporarily associating an account with a voice-enabled device.

FIG. 2 illustrates a flow diagram of an example process 200 for establishing temporary account associations with voice-enabled devices. The order in which the operations or steps are described is not intended to be construed as a limitation, and any number of the described operations may be combined in any order and/or in parallel to implement process 200. As shown in FIG. 2, examples of which device and/or system may perform each of the depicted operations has been provided. It should be understood, however, that one or more of the operations may be performed by a device and/or system that differs from the device and/or system specifically illustrated in FIG. 2. The voice-enabled device of FIG. 2 may be the same as or similar to the voice-enabled device 102 described in FIG. 1B. The remote system of FIG. 2 may be the same as or similar to the remote system 120 described in FIG. 1B. The personal device of FIG. 2 may be the same as or similar to the personal device 106 described in FIG. 1B.

At block 202, the process 200 may include generating audio data representing a user utterance. For example, a user may speak a user utterance to the voice-enabled device. The microphones of the voice-enabled device may capture the user utterance and may generate corresponding audio data. The audio data may be sent, via a network, to the remote system.

At block 204, the process 200 may include determining that a resource is not available to a default user account associated with the voice-enabled device. For example, an ASR component of the remote system may process the audio data and generate corresponding text data. An NLU component of the remote system may utilize the text data to determine intent data representing an intent of the user to, in these examples, perform an action that utilizes one or more system resources and/or an intent to temporarily associate a user account with a voice-enabled device. For example, the user utterance may be "play Song A." The remote system, utilizing the NLU component, may determine that a resource is to be available to perform the action of outputting audio corresponding to Song A. For example, the voice-enabled device may be associated with a default user account associated with an environment. That default user account may not have access to a resource to output Song A. By way of example, the default user account may not be associated with a music service and/or database that permits playing Song A. In these examples, a speechlet of the remote system may be utilized to start the process of temporarily associating a personal user account associated with the user with the voice-enabled device.

At block 206, the process 200 may include generating a directive and audio data requesting contact information. The directive and the audio data may be sent to the voice-enabled device. For example, the speechlet of the remote system described above may receive the intent data from the NLU component and may utilize the intent data to identify, determine, and/or generate a directive corresponding to the intent data. For example, the speechlet may be called and utilized to generate the directive that, when sent to and utilized by the voice-enabled device, causes output of audio, such as via the speakers, representing a request for information to temporarily associate a user account with the voice-enabled device. A TTS component of the remote system may be utilized to generate audio data to be utilized by the voice-enabled device to output the audio as directed by the directive generated by the speechlet.

At block 208, the process 200 may include outputting, based at least in part on the directive, audio corresponding to the audio data. For example, the output audio may be "we can't perform that operation, please provide your phone number to link your account to this device." The example audio provided above is provided by way of illustration only and not as a limitation. In should be understood that while the example of contact information is provided as a phone number, the contact information may additionally, or alternatively, include an email address and/or a social media account identifier, for example. Additionally, while the request of contact information has been described as being provided by way of audio through the speakers of the voice-enabled device, it should be understood that the audio may be provided through speakers other than those of the voice-enabled device, and/or the request may be presented in ways other than, or in addition to, audibly. For example, in instances where the voice-enabled device includes a display and/or is in message with a device with a display, the request may be presented visually.

At block 210, the process 200 may include generating audio data representing contact information. For example, the user may provide a second user utterance that includes the contact information. The microphones of the voice-enabled device may capture audio corresponding to the user utterance and may generate corresponding audio data. The audio data may be sent to the remote system for processing. For example, the ASR component of the remote system may generate text data corresponding to the audio data and representing the contact information.

At block 212, the process 200 may include generating a code pair that associates the contact information with a device identifier associated with a device to which the contact information corresponds to. Generation of the code pair may be performed by a code-pair component of the remote system. The code-pair component may generate a code pair that associates a device identifier associated with the voice-enabled device, the contact information provided by the user, and/or a selectable portion of the message, described in more detail with respect to block 214. The code-pair component may be utilized to encrypt the device identifier, contact information, and/or the message.

At block 214, the process 200 may include generating a message associated with a link, or other selectable portion, for account-credential input. The message may be sent to the personal device associated with the contact information, such as by utilizing the code pair. For example, the text data from the ASR component may be provided to a notification component of the remote system, which may be configured to identify, determine, and/or generate a message to be sent to the personal device associated with the contact information. In examples, the message may be a SMS message. In other examples, the message may be an email, a telephone call, a social media message, such as a direct message, or another form of message that can be received by the personal device.

The notification component may generate the message and/or a portion thereof. For example, a selectable portion may be generated that is associated with the message, such as a webpage link, that when selected may assist in gathering account access information, such as a username and/or password associated with the personal user account. The notification component of the remote system may be utilized to send the message to the personal device, where a message application of the personal device may be utilized to receive and/or display the message.

At block 216, the process 200 may include receiving input selecting the link and/or selectable portion. In some examples, the selectable portion, when selected, may cause the website application of the personal device, such as a website access and/or browsing application, to open and display a webpage that allows the user to input the account access information. In other examples, the selectable portion of the message, when selected, may cause a voice-enabled-device application associated with the user account, such as a companion application, to be accessed. The voice-enabled-device application may have access to the account access information and may be utilized to acquire the account access information without the user inputting that information into, for example, a website application. Input data corresponding to the input may be generated and may be utilized to open a webpage application that may, at block 218, display a webpage allowing for input of account credentials associated with the user account. Input data corresponding to the account credentials may be generated and may be sent to the remote system.

At block 220, the process 200 may include associating the user account corresponding to the account credentials with the voice-enabled device. For example, upon receiving additional audio data from the voice-enabled device, an association-management component of the remote system may be utilized to determine that the user account is actively associated with the device identifier associated with the voice-enabled device. This information may be utilized to determine how to process the audio data and/or which resources may be utilized to perform one or more actions associated with the audio data.

At block 222, the process 200 may include outputting audio confirming accounting association with the voice-enabled device. For example, the remote system may generate directive data and/or audio data based at least in part on the user account being associated with the voice-enabled device. The directive data and/or the audio data may be sent to the voice-enabled device, and audio corresponding to the audio data may be output via speakers of the voice-enabled device. By so doing, the user may be provided with confirmation that his/her user account has been successfully associated with the voice-enabled device.

At block 224, based at least in part on the user account being associated with the voice-enabled device, the process 200 may include causing a webpage to be displayed on the personal device. The webpage may allow for input of an indication of when the user account should be dissociated from the device identifier associated with the voice-enabled device. Input data corresponding to the input may be generated and may be sent to the remote system. For example, a message may be sent to the personal device that causes and/or allows the website application to display a webpage that allows a user of the personal device to input an indication associated with their stay at the environment. This indication may include, for example, a checkout time and/or a checkout day, from the environment. This information may be utilized to determine a period of time during which the association between the user account and the voice-enabled device is to be maintained, and when the user account should be dissociated from the voice-enabled device. By providing this functionality, the user is able to control when potentially-personal information and/or capabilities are available to the voice-enabled device 102 and when that information and those capabilities should not be available.

The notification component, and/or other components of the remote system, may be configured to request scheduling data from one or more devices and/or systems associated with the environment. The scheduling data may indicate the period of time that a user is staying at the environment, which may be utilized to identify and/or determine the period of time to maintain the association between the user account and the voice-enabled device.

At block 226, the process 200 may include receiving the dissociation-time data. For example, the association-management component of the remote system may be configured to store data associated with the period of time that the account is to be associated with the voice-enabled device. The association-management component may additionally, or alternatively, be configured to store dissociation-event data indicating one or more dissociation events that, when one of the dissociation events occurs, causes the user account to be dissociated with the voice-enabled device. The dissociation events may include receiving an indication that the user has checking out from the environment. Additionally, or alternatively, the remote system may receive additional audio data representing another user utterance, and the remote system may determine that an intent associated with the user utterance is to dissociate the user account from the voice-enabled device. Receipt of this audio data and/or determining that the user utterance corresponds to an intent to dissociate may be considered a dissociation event. The dissociation events may also include temporary dissociation events. For example, the voice-enabled device and/or the remote system may be configured to receive an indication that a lock and/or keycard reader associated with the environment has been utilized to leave a room. Based at least in part on this indication, the association-management component may be configured to temporarily dissociate the user account from the voice-enabled device, such as until the lock and/or keycard reader indicates the user has entered the room.

The association-management component may additionally be configured to determine when one or more events occur that cause the period of time to maintain the association between the user account and the voice-enabled device to change. For example, the remote system may receive an indication that the period of time is to be increased or decreased. By way of example, a user may decide to check out early from a hotel and/or the user may decide to extend his or her stay. In other examples, the indication that the period of time has been increased or decreased may be received from a system associated with the environment. An indication of such an event may be sent to and received by the remote system and may be utilized to identify, determine, and/or generate a second period of time to maintain the association between the user account and the voice-enabled device.

At block 228, the process 200 may include dissociating the user account from the voice-enabled device based at least in part on the dissociation-time data. Dissociation of the user account from the voice-enabled device may be based at least in part on at least one of the period of time lapsing and/or the occurrence of a dissociation event.

FIG. 3 illustrates a flow diagram of an example process 300 for utilizing a voice-enabled device that has been temporarily associated with an account. The order in which the operations or steps are described is not intended to be construed as a limitation, and any number of the described operations may be combined in any order and/or in parallel to implement process 300. As shown in FIG. 3, examples of which device and/or system may perform each of the depicted operations has been provided. It should be understood, however, that one or more of the operations may be performed by a device and/or system that differs from the device and/or system specifically illustrated in FIG. 3. The voice-enabled device of FIG. 3 may be the same as or similar to the voice-enabled device 102 described in FIG. 1B. The remote system of FIG. 3 may be the same as or similar to the remote system 120 described in FIG. 1B. The personal device of FIG. 3 may be the same as or similar to the personal device 106 described in FIG. 1B.

At block 302, the process 300 may include generating audio data representing a user utterance. For example, a user may speak a user utterance to the voice-enabled device. The microphones of the voice-enabled device may capture the user utterance and may generate corresponding audio data. The audio data may be sent, via a network, to the remote system.

At block 304, the process 300 may include generating intent data representing an intent associated with the user utterance. For example, the audio data may be processed using ASR techniques, which are described in more detail with respect to FIG. 12 below, to generate text data representing the user utterance. NLU techniques, which again are described in more detail with respect to FIG. 12 below, may utilize the text data to generate the intent data. For example, the user utterance may be "play Song A." The ASR component of the remote system may generate text data representing the text "play Song A." The NLU component of the remote system may generate intent data representing a "play" intent and the associated value of "Song A" identifying what is to be played. This intent data may be sent, along with the device identifier of the voice-enabled device, to a speechlet configured to handle the intent determined by the NLU component. In examples where the voice-enabled device is temporarily associated with a user account, the association-management component, which may store data indicating temporary associations between device identifiers and user accounts, may be utilized to determine that the resources associated with the user account are available for service the intent.

At block 306, the process 300 may include identifying active-account data based at least in part on the association between the user account and the voice-enabled device. For example, the association-management component may be queried and/or may be utilized to determine whether the active-account associated with the device identifier of the voice-enabled device is the default account or a temporarily-associated user account. In these examples where the device identifier has been associated with the user account, active-account data from the association-management component may be utilized to determine that the available resources are those associated with the temporarily-associated user account.

At block 308, the process 300 may include accessing a resource associated with the user account and the intent. Using the example provided above, the user account associated with the voice-enabled device may have access to and/or permission to use one or more resources such as music services and/or functionalities that provide the ability to play "Song A." The one or more resources may be accessed and may be utilized to perform the requested action.

At block 310, the process 300 may include generating a directive to perform an operation utilizing the resource. For example, the speechlet may utilize the resources to generate a directive for an action to be performed. Using the example provided herein, the directive may be for the voice-enabled device to output audio corresponding to Song A.

At block 312, the process 300 may include the voice-enabled device receiving the directive. Audio data corresponding to the directive may also be received.

At block 314, the process 300 may include performing the action and/or outputting audio confirming that the action has been performed. For example, some actions are to be performed by the voice-enabled device. Those actions may be, for example, outputting audio corresponding to a song, setting a timer, displaying a video on a display of the voice-enabled device, etc. In these examples, the directive data may cause the voice-enabled device to perform the action. In other examples, the actions are to be performed by a device other than the voice-enabled device. Those actions may be, for example, ordering a product, operating an appliance, operating light bulbs, etc. In these examples, the directive data may cause the one or more other devices to perform the action and the voice-enabled device may be utilized to output audio confirming that the action has been performed. It should be understood that performance of an action may include implicit performance of actions by the voice-enabled device and/or the remote system.

At block 316, the process 300 may include the personal device receiving a notification of the action. The notification may serve the purpose of confirming the performance of the action and confirming that the user account is associated with the voice-enabled device. If the user account should not be associated with the voice-enabled device, the notification may serve to provide the opportunity for the use of the personal device to dissociate the user account from the voice-enabled device. The sending of notifications may be optional and may be determined by one or more user preferences associated with the user account.

Figure 4:
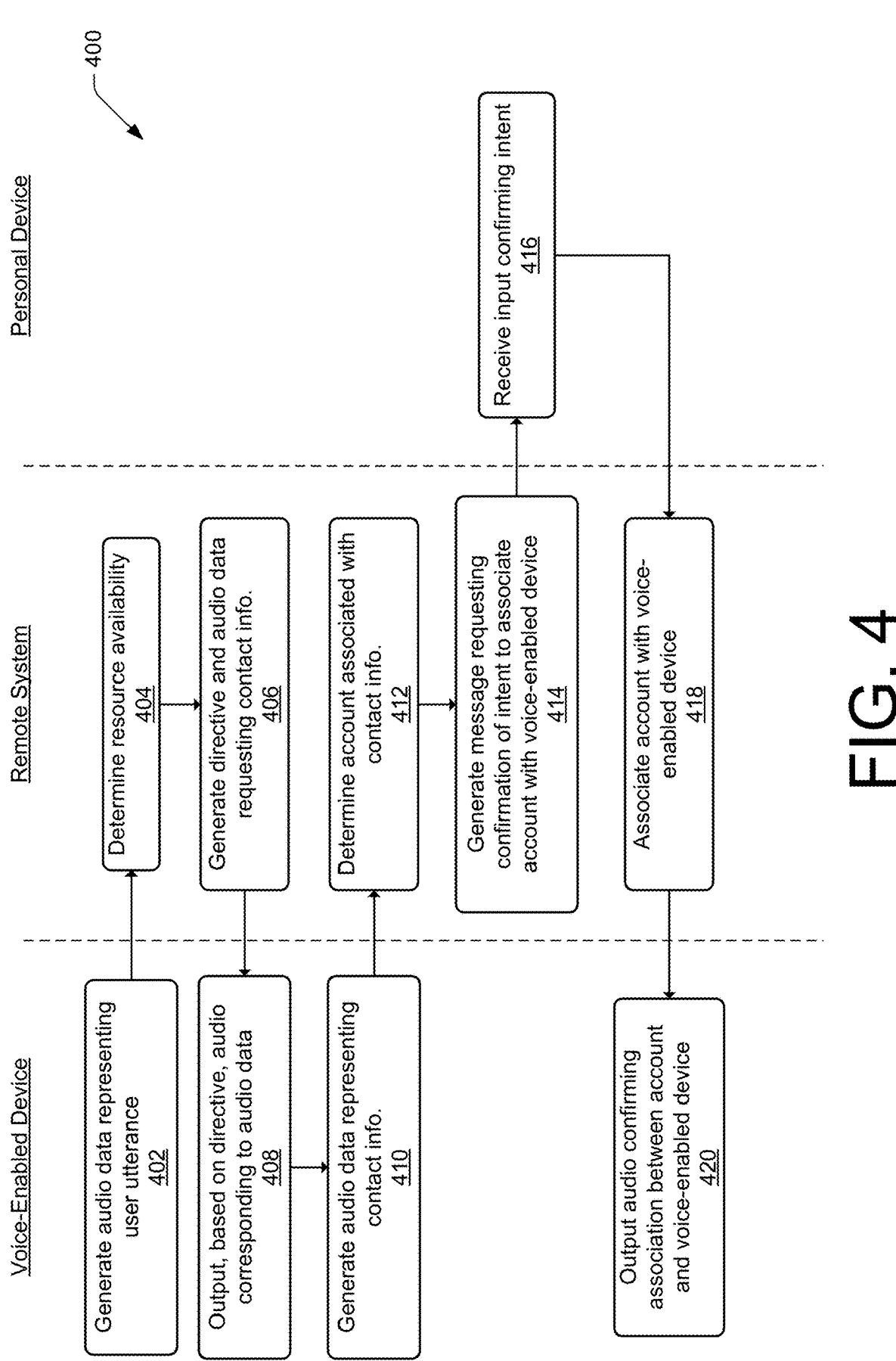
FIG. 4 illustrates a flow diagram of an example process for temporarily re-associating an account with a voice-enabled device using contact information.

FIG. 4 illustrates a flow diagram of an example process 400 for temporarily re-associating an account with a voice-enabled device using contact information. The order in which the operations or steps are described is not intended to be construed as a limitation, and any number of the described operations may be combined in any order and/or in parallel to implement process 400. As shown in FIG. 4, examples of which device and/or system may perform each of the depicted operations has been provided. It should be understood, however, that one or more of the operations may be performed by a device and/or system that differs from the device and/or system specifically illustrated in FIG. 4. The voice-enabled device of FIG. 4 may be the same as or similar to the voice-enabled device 102 described in FIG. 1B. The remote system of FIG. 4 may be the same as or similar to the remote system 120 described in FIG. 1B. The personal device of FIG. 4 may be the same as or similar to the personal device 106 described in FIG. 1B.

At block 402, the process 400 may include generating audio data representing a user utterance. For example, a user may speak a user utterance to the voice-enabled device. The microphones of the voice-enabled device may capture the user utterance and may generate corresponding audio data. The audio data may be sent, via a network, to the remote system.

At block 404, the process 400 may include determining that a resource is not available to a default user account associated with the voice-enabled device. For example, an ASR component of the remote system may process the audio data and generate corresponding text data. An NLU component of the remote system may utilize the text data to determine intent data representing an intent of the user to, in these examples, perform an action that utilizes one or more system resources and/or an intent to temporarily associate a user account with a voice-enabled device. For example, the user utterance may be "play Song A." The remote system, utilizing the NLU component, may determine that a resource is to be available to perform the action of outputting audio corresponding to Song A. For example, the voice-enabled device may be associated with a default user account associated with an environment. That default user account may not have access to a resource to output Song A. By way of example, the default user account may not be associated with a music service and/or database that permits playing Song A. In these examples, a speechlet of the remote system may be utilized to start the process of temporarily associating a personal user account associated with the user with the voice-enabled device.

At block 406, the process 400 may include generating a directive and audio data requesting contact information. The directive and the audio data may be sent to the voice-enabled device. For example, the speechlet of the remote system described above may receive the intent data from the NLU component and may utilize the intent data to identify, determine, and/or generate a directive corresponding to the intent data. For example, the speechlet may be called and utilized to generate a directive that, when sent to and utilized by the voice-enabled device, causes output of audio, such as via the speakers, representing a request for information to temporarily associate a user account with the voice-enabled device. A TTS component of the remote system may be utilized to generate audio data to be utilized by the voice-enabled device to output the audio as directed by the directive generated by the speechlet.

At block 408, the process 400 may include outputting, based at least in part on the directive, audio corresponding to the audio data. For example, the output audio may be "we can't perform that operation, please provide your phone number to link your account to this device." The example audio provided above is provided by way of illustration only and not as a limitation. In should be understood that while the example of contact information is provided as a phone number, the contact information may additionally, or alternatively, include an email address and/or a social media account identifier, for example. Additionally, while the request for contact information has been described as being provided by way of audio through the speakers of the voice-enabled device, it should be understood that the audio may be provided through speakers other than those of the voice-enabled device, and/or the request may be presented in ways other than, or in addition to, audibly. For example, in instances where the voice-enabled device includes a display and/or is in message with a device with a display, the request may be presented visually.

At block 410, the process 400 may include generating audio data representing contact information. For example, the user may provide a second user utterance that includes the contact information. The microphones of the voice-enabled device may capture audio corresponding to the user utterance and may generate corresponding audio data. The audio data may be sent to the remote system for processing. For example, the ASR component of the remote system may generate text data corresponding to the audio data and representing the contact information.

At block 412, the process 400 may include determining a user account that is associated with the contact information. For example, where the user is a repeat user or has otherwise previously gone through the process of temporarily associating a user account with a voice-enabled device, the process 400 need not include acquiring account credential information from the user. Instead, an association-management component of the remote system may have stored therein data associating user accounts with contact information. As such, when a repeat user provides his/her contact information, the remote system may query the association-management component and identify the user account to be associated with a voice-enabled device without requesting such information from the user or the personal device. It should be noted that this process 400 may be utilized in situations where the user visits the same environment or a different environment, and/or if the user stays in the same room of the environment or a different room. In other words, the process 400 may be utilized for temporarily associating a user account with any voice-enabled device associated with the remote system and/or available to the remote system.

At block 414, the process 400 may include generating a message requesting confirmation of intent to associate the user account with the voice-enabled device. This operation may be optional and may be provided as a means of ensuring that the user is authorized to associate the user account with the voice-enabled device. The message may be sent to the personal device.

At block 416, the process 400 may include receiving, at the personal device, input confirming the intent to associate the user account with the voice-enabled device. For example, the message may request the user to provide input confirming that the user, who is associated with the personal device and the contact information utilized to communicate with the personal device, desires to temporarily re-associate the user account with the voice-enabled device.

At block 418, the process 400 may include associating the user account with the voice-enabled device based at least in part on receiving input data from the personal device indicating that the user has confirmed the intent to associate the user account with the voice-enabled device. At block 420, the process 400 may include outputting audio confirming the association between the user account and the voice-enabled device. Outputting the audio may be based at least in part on directive data received from the remote system directing the voice-enabled device to output audio confirming the association. Thereafter, the user may provide subsequent user utterances representing commands for the voice-enabled device and/or one or more other devices and/or systems to perform actions.

Figure 5:
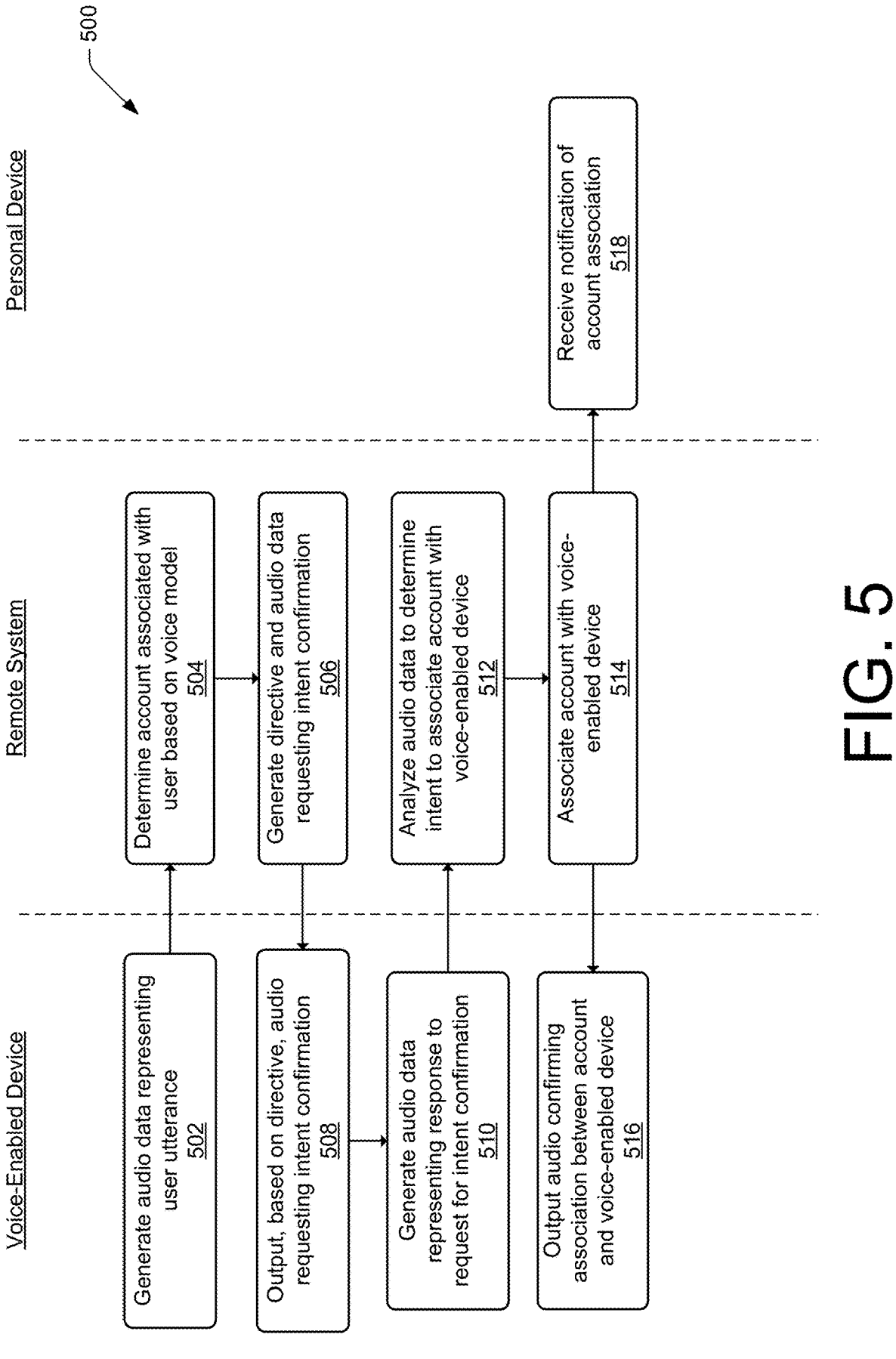
FIG. 5 illustrates a flow diagram of an example process for temporarily re-associating an account with a voice-enabled device using a voice model.

FIG. 5 illustrates a flow diagram of an example process 500 for temporarily re-associating an account with a voice-enabled device using a voice model. The order in which the operations or steps are described is not intended to be construed as a limitation, and any number of the described operations may be combined in any order and/or in parallel to implement process 500. As shown in FIG. 5, examples of which device and/or system may perform each of the depicted operations has been provided. It should be understood, however, that one or more of the operations may be performed by a device and/or system that differs from the device and/or system specifically illustrated in FIG. 5. The voice-enabled device of FIG. 5 may be the same as or similar to the voice-enabled device 102 described in FIG. 1B. The remote system of FIG. 5 may be the same as or similar to the remote system 120 described in FIG. 1B. The personal device of FIG. 5 may be the same as or similar to the personal device 106 described in FIG. 1B.

At block 502, the process 500 may include generating audio data representing a user utterance. For example, a user may speak a user utterance to the voice-enabled device. The microphones of the voice-enabled device may capture the user utterance and may generate corresponding audio data. The audio data may be sent, via a network, to the remote system.

At block 504, the process 500 may include determining a user account associated with the user based at least in part on one or more voice models. For example, identification of the user may include determining that a voice signature of the audio data matches or most closely matches a reference voice signature stored and/or accessed by the voice model. A user identifier associated with the user may be associated with the user account.

At block 506, the process 500 may include generating a directive and audio data requesting intent confirmation from the user of the voice-enabled device. For example, the audio data may include an indicator of the user account that the remote system has determined to be associated with the user.

At block 508, the process 500 may include outputting, based at least in part on the directive, audio requesting the intent confirmation. The output audio may include the indicator of the user account that the remote system determined to be associated with the user. Additionally, or alternatively, the output audio may include a request for the user to provide an indication of intent to confirm that the user account is to be associated with the voice-enabled device. For example, the output audio may include "would you like to link Rob's account to this device?" The user may then provide another user utterance to the voice-enabled device in response to the request for confirmation.

At block 510, the process 500 may include generating audio data representing the response to the request for intent confirmation. The audio data may be sent to the remote system for processing. At block 512, the process 500 may include analyzing the audio data to determine the intent to associate the user account with the voice-enabled device. This analysis may include confirming, using the voice model, that the audio data corresponding to the response also matches or best matches the user identifier.

At block 514, the process 500 may include temporarily associating the user account with the voice-enabled. In these examples, a message or other notification may be sent, at block 518, to the personal device and/or, at block 516, to the voice-enabled device indicating that the account has been associated with the voice-enabled device. By so doing, if an account was mistakenly or nefariously associated with a voice-enabled device, the user associated with that account may be notified so that corrective action may be taken.

Figure 6:
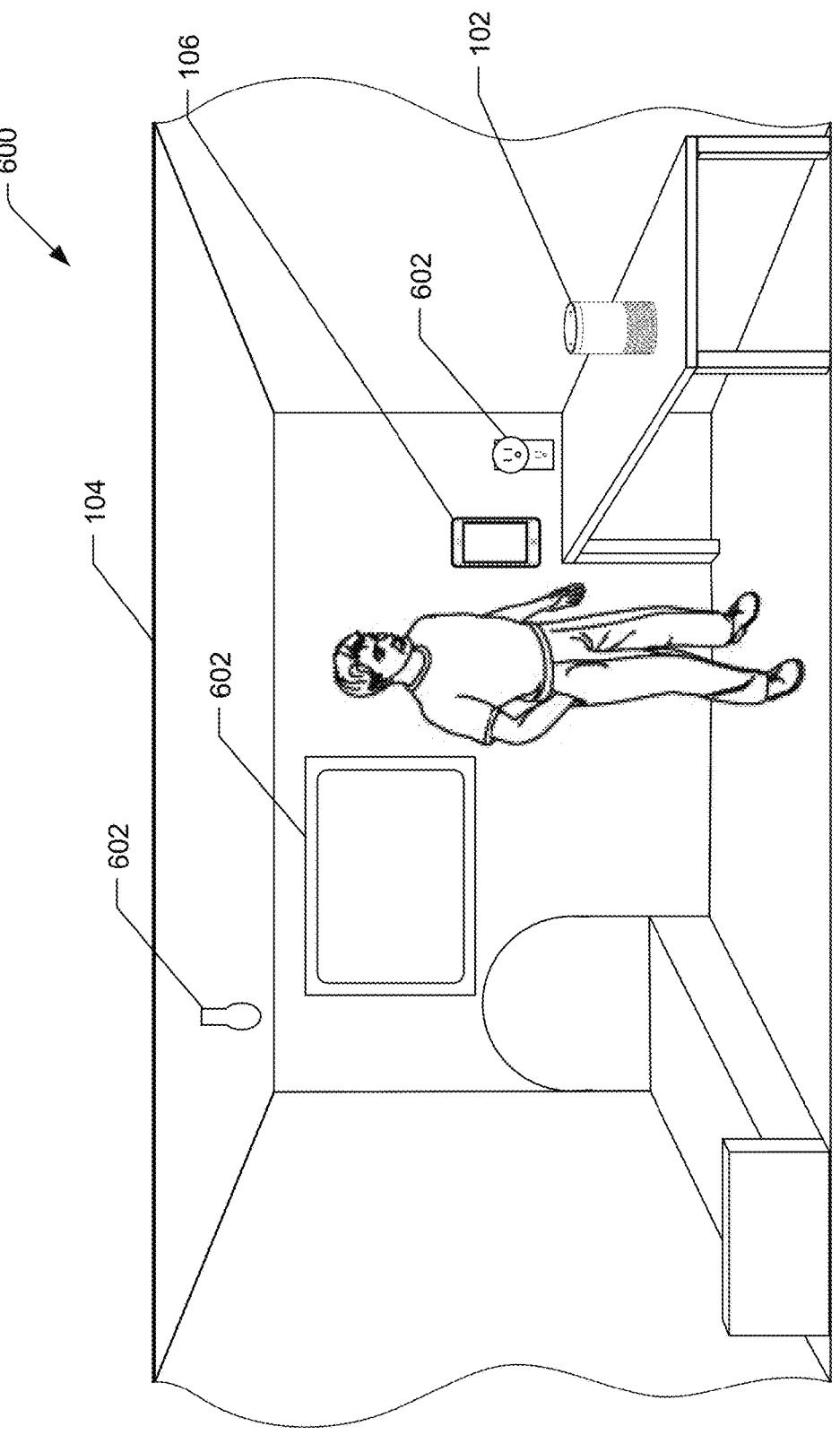
FIG. 6 illustrates an example environment for temporary account association with one or more voice-enabled devices.

FIG. 6 illustrates an example environment 600 for temporary account association with one or more voice-enabled devices. The environment 600 may include the same or similar devices and/or systems as the environment 100 from FIG. 1B. For example, the environment 600 may include an environment 104, which may have situated therein a voice-enabled device 102 and a personal device 106 associated with a user. The environment 600 may additionally include one or more accessory device 602.

A device-association component of the remote system may be configured to identify, determine, generate, and/or store device-association data indicating associations between the voice-enabled device 102 and the one or more other accessory devices 602 within the environment 104. For example, the environment 104 may include one or more "smart," accessory devices 602 configured to communicate with the voice-enabled device 102. Examples of such accessory devices 602 may include light bulbs, televisions, plugs, outlets, locks, and/or appliances. The device-association component may be configured to store device-association data indicating which of these accessory devices are associated with the voice-enabled device 102. In examples, once a user account is associated with the voice-enabled device 102, the user may be able to provide user utterances to control functionality of the accessory devices 602, such as via the voice-enabled device 102.

For example, the user may say "turn on the lights," "turn on the smart plug," "volume down on the television," etc. The microphones of the voice-enabled device 102 may capture such a user utterance and may generate corresponding audio data. The audio data may be sent to the remote system for processing. Additionally, an association-management component of the remote system may be utilized to determine the active account currently associated with the voice-enabled device and may utilize the resources associated with that active account to service the request represented by the user utterance.

In examples, once a user account has been temporarily associated with a device identifier of a voice-enabled device, the user account may have access to a first group of resources and the default account may have access to a second group of resources. Some of the resources in the first group of resources may be the same as resources in the second group of resources, and/or some of the resources in the first group of resources may differ from the resources in the second group of resources. In these examples, account arbitration may be performed by the remote system to determine which user account to use to process and respond to a user utterance. In some examples, the account arbitration may include prioritizing the temporarily-associated user account over the default account unless the temporarily-associated user account does not have access to a resource to process a request, such as ordering room service. In other examples, the account arbitration may include prioritizing the default account over the temporarily-associated user account unless the default account does not have access to a resource to process a request.

Additionally, or alternatively, some user accounts may be associated with their own voice-enabled devices. For example, some users may have a voice-enabled device associated with the remote system at home and/or at the office. The user account may be associated with that personal voice-enabled device. In these examples, a user request, such as "turn off the lights" may indicate an intent to turn off the lights in the environment or to turn off the lights at home. The remote system may perform action arbitration to prioritize one or more actions over other actions. For example, the remote system may prioritize actions associated with the environment when the user account is temporarily associated with the voice-enabled device in the environment. In other examples, the remote system may prioritize actions associated with the home and/or office device. In other examples, when a request corresponds to an action that may be performed by one or multiple devices, the remote system may cause the voice-enabled device from which the audio data was received to request additional information from the user, such as "do you want me to turn off the lights in this room or at home," before taking an action.

FIGS. 7-11 illustrate various processes for establishing temporary account associations with voice-enabled devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1A-6, 12, and 13, although the processes may be implemented in a wide variety of other environments, architectures and systems.

FIG. 7 illustrates a flow diagram of an example process 700 for temporary account association with voice-enabled devices. The order in which the operations or steps are described is not intended to be construed as a limitation, and any number of the described operations may be combined in any order and/or in parallel to implement process 700.

At block 702, the process 700 may include receiving, from a voice-enabled device, first audio data representing a first user utterance requesting performance of an action, the voice-enabled device being associated with a first account. For example, a user may speak a user utterance to the voice-enabled device. The microphones of the voice-enabled device may capture the user utterance and may generate corresponding audio data. The audio data may be sent, via a network, to the remote system where the remote system may receive the audio data.

At block 704, the process 700 may include determining that a resource for performing the action is unassociated with the first account. For example, an ASR component of the remote system may process the audio data and generate corresponding text data. An NLU component of the remote system may utilize the text data to determine intent data representing an intent of the user to, in these examples, perform an action that utilizes one or more system resources and/or an intent to temporarily associate a user account with a voice-enabled device. For example, the user utterance may be "play Song A." The remote system, utilizing the NLU component, may determine that a resource is to be available to perform the action of outputting audio corresponding to Song A. For example, the voice-enabled device may be associated with a default user account associated with an environment. That default user account may not have access to a resource to output Song A. By way of example, the default user account may not be associated with a music service and/or database that permits playing Song A. In these examples, a speechlet of the remote system may be utilized to start the process of temporarily associating a personal user account associated with the user with the voice-enabled device.

At block 706, the process 700 may include sending, to the voice-enabled device, a directive to output via a speaker of the voice-enabled device audio representing a request for a telephone number. For example, the remote system may generate directive data and audio data requesting contact information. The directive data and the audio data may be sent to the voice-enabled device. For example, the speechlet of the remote system described above may receive the intent data from the NLU component and may utilize the intent data to identify, determine, and/or generate directive data corresponding to the intent data. For example, the speechlet may be called and utilized to generate directive data that, when sent to and utilized by the voice-enabled device, causes output of audio, such as via the speakers, representing a request for information to temporarily associate a user account with the voice-enabled device. A TTS component of the remote system may be utilized to generate audio data to be utilized by the voice-enabled device to output the audio as directed by the directive data generated by the speechlet.

Audio corresponding to the audio data may be output based at least in part on the directive data. For example, the output audio may be "we can't perform that operation, please provide your phone number to link your account to this device." The example audio provided above is provided by way of illustration only and not as a limitation. In should be understood that while the example of contact information is provided as a phone number, the contact information may additionally, or alternatively, include an email address and/or a social media account identifier, for example. Additionally, while the request of contact information has been described as being provided by way of audio through the speakers of the voice-enabled device, it should be understood that the audio may be provided through speakers other than those of the voice-enabled device, and/or the request may be presented in ways other than, or in addition to, audibly. For example, in instances where the voice-enabled device includes a display and/or is in message with a device with a display, the request may be presented visually.

At block 708, the process 700 may include receiving, from the voice-enabled device, second audio data representing a second user utterance including the telephone number. For example, the user may provide a second user utterance that includes the contact information, here including the telephone number. The microphones of the voice-enabled device may capture audio corresponding to the user utterance and may generate corresponding audio data. The audio data may be sent to the remote system for processing. For example, the ASR component of the remote system may generate text data corresponding to the audio data and representing the contact information.

At block 710, the process 700 may include receiving, from the voice-enabled device, a device identifier of the voice-enabled device. For example, data representing the device identifier may be sent from the voice-enabled device to the remote system, such as along with the second audio data. In other examples, the device identifier may be determined by the remote system based at least in part on information associated with the voice-enabled device.

At block 712, the process 700 may include generating a message associated with a second request to provide authentication information associated with the second account. For example, a code pair may be generated that associates the contact information with the device identifier associated with a device to which the contact information corresponds to. Generation of the code pair may be performed by a code-pair component of the remote system. The code-pair component may generate a code pair that associates a device identifier associated with the voice-enabled device, the contact information provided by the user, and/or a selectable portion of the message, described in more detail below. The code-pair component may be utilized to encrypt the device identifier, contact information, and/or the message.

The message may be generated and may include a link, or other selectable portion, for account-credential input. The notification component may utilize an authentication-link component of the remote system to generate the message and/or a portion thereof. For example, the authentication-link component may be utilized to identify, determine, and/or generate a selectable portion of the message, such as a webpage link, that when selected may assist in gathering account access information, such as a username and/or password associated with the personal user account.

At block 714, the process 700 may include sending the message to a personal device associated with the phone number. The notification component of the remote system may be utilized to send the message to the personal device, where a message application of the personal device may be utilized to receive and/or display the message. The message may be sent to the personal device associated with the contact information, such as by utilizing the code pair. For example, the text data from the ASR component may be provided to a notification component of the remote system, which may be configured to identify, determine, and/or generate a message to be sent to the personal device associated with the contact information. In examples, the message may be a SMS message. In other examples, the message may be an email, a telephone call, a social media message, such as a direct message, or another form of message that can be received by the personal device.

At block 716, the process 700 may include receiving, from the personal device, authentication data identifying the second account and authenticating access to the second account. For example, input data corresponding to input provided by the user and/or identified from an application accessed by the personal device may represent the account credentials and may be generated and sent to the remote system.

At block 718, the process 700 may include associating an account identifier corresponding to the second account with the device identifier of the voice-enabled device. For example, upon receiving additional audio data from the voice-enabled device, an association-management component of the remote system may be utilized to determine that the account identifier is actively associated with the device identifier associated with the voice-enabled device. This information may be utilized to determine how to process the audio data and/or which resources may be utilized to perform one or more actions associated with the audio data.

The process 700 may additionally, or alternatively, include sending, to the personal device, a second message requesting an indication of when the user account is to be dissociated from the device identifier. The process 700 may also include receiving, from the personal device, the indication and determining a period of time from the indication. The process 700 may also include dissociating the account identifier from the device identifier upon the period of time lapsing.

The process 700 may additionally, or alternatively, include receiving, from the voice-enabled device, additional audio data representing another user utterance for performance of the action. The process 700 may also include associating the audio data with the user account when the audio data is received during a predetermined period of time and determining that the resource to perform the action is associated with the user account. The process 700 may also include generating a second directive to perform the action utilizing the resource and sending the second directive to the voice-enabled device.

The process 700 may additionally, or alternatively, include receiving, from a second voice-enabled device associated with a second environment, additional audio data representing another user utterance to perform the action. The second environment may be associated with another default account. The process 700 may also include determining that the resource to perform the action is absent from the other default account and sending, to the second voice-enabled device, the directive to output audio requesting contact information from the user. The process 700 may also include receiving, from the second voice-enabled device, audio data representing another user utterance including the contact information. The process 700 may also include identifying the user account based at least in part on the contact information and receiving a second device identifier associated with the second voice-enabled device. The process 700 may also include associating the account identifier with the second device identifier. In this way, a repeat visitor to an environment having a voice-enabled device associated with the remote system may temporarily associate the user account with the voice-enabled device without use of the personal device.

FIG. 8 illustrates a flow diagram of another example process 800 for temporary account association with voice-enabled devices. The order in which the operations or steps are described is not intended to be construed as a limitation, and any number of the described operations may be combined in any order and/or in parallel to implement process 800.

At block 802, the process 800 may include receiving, from a voice-enabled device, audio data representing a user utterance including contact information. For example, the user may provide a user utterance that includes the contact information. The microphones of the voice-enabled device may capture audio corresponding to the user utterance and may generate corresponding audio data. The audio data may be sent to the remote system for processing. For example, the ASR component of the remote system may generate text data corresponding to the audio data and representing the contact information.

At block 804, the process 800 may include receiving, from the voice-enabled device, a device identifier of the voice-enabled device. For example, data representing the device identifier may be sent from the voice-enabled device to the remote system, such as along with the audio data. In other examples, the device identifier may be determined by the remote system based at least in part on information associated with the voice-enabled device.

At block 806, the process 800 may include generating an encrypted device identifier. For example, a request to "seal" or otherwise encrypt the device identifier associated with the voice-enabled device may be sent to a data-encryption component of a remote system, which may seal or otherwise encrypt the device identifier. Data representing the encrypted device identifier may be received by a managed-property speechlet for further processing.

At block 808, the process 800 may include generating a code pair associated with a selectable link and including the encrypted device identifier. For example, the managed-property speechlet may request a code pair from a customer-authentication component of the remote system. The code pair may include and/or represent a URL for dissociation information input and/or the sealed device identifier. The managed-property speechlet may receive the code pair and may send the code pair, device identifier, and contact information to the notification component.

At block 810, the process 800 may include generating a message associated with a request to provide authentication information associated with a user account via the selectable link. For example, the code pair may associate the contact information with the device identifier associated with a device to which the contact information corresponds to.

The message may be generated and may be associated with a link, or other selectable portion, for account-credential input. The notification component may utilize an authentication-link component of the remote system to generate the message and/or a portion thereof. For example, the authentication-link component may be utilized to identify, determine, and/or generate a selectable portion of the message, such as a webpage link, that when selected may assist in gathering account access information, such as a username and/or password associated with the personal user account.

At block 812, the process 800 may include sending the message to a personal device associated with the contact information. For example, the notification component of the remote system may be utilized to send the message to the personal device, where a message application of the personal device may be utilized to receive and/or display the message. The message may be sent to the personal device associated with the contact information, such as by utilizing the code pair. For example, the text data from the ASR component may be provided to a notification component of the remote system, which may be configured to identify, determine, and/or generate a message to be sent to the personal device associated with the contact information. In examples, the message may be a SMS message. In other examples, the message may be an email, a telephone call, a social media message, such as a direct message, or another form of message that can be received by the personal device.

At block 814, the process 800 may include receiving, from the personal device, authentication data authenticating access to the user account via the selectable link. For example, input data corresponding to input provided by the user and/or identified from an application accessed by the personal device may represent the account credentials and may be generated and sent to the remote system.

At block 816, the process 800 may include causing, based at least in part on receiving the authentication data, an account identifier of the user account with the device identifier of the voice-enabled device. For example, upon receiving additional audio data from the voice-enabled device, an association-management component of the remote system may be utilized to determine that the user account is actively associated with the device identifier associated with the voice-enabled device. This information may be utilized to determine how to process the audio data and/or which resources may be utilized to perform one or more actions associated with the audio data.

The process 800 may additionally, or alternatively, include sending, to the personal device, a second message requesting an indication of when the user account is to be dissociated from the device identifier. The process 800 may also include receiving, from the personal device, the indication and determining a period of time from the indication. The process 800 may also include dissociating the account identifier from the device identifier upon the period of time lapsing.

The process 800 may additionally, or alternatively, include receiving, from the voice-enabled device, additional audio data representing another user utterance for the voice-enabled device to perform the action. The process 800 may also include associating the audio data with the user account when the audio data is received during a period of time and determining that the resource to perform the action is associated with the user account. The process 800 may also include generating a second directive to perform the action utilizing the resource and sending the second directive to the voice-enabled device.

The process 800 may additionally, or alternatively, include receiving, from a second voice-enabled device associated with a second environment, additional audio data representing another user utterance to perform the action. The second environment may be associated with another default account. The process 800 may also include determining that the resource to perform the action is absent from the other default account and sending, to the second voice-enabled device, the directive to output audio requesting contact information from the user. The process 800 may also include receiving, from the second voice-enabled device, audio data representing another user utterance including the contact information. The process 800 may also include identifying the user account based at least in part on the contact information and receiving a second device identifier associated with the second voice-enabled device. The process 800 may also include associating the account identifier with the second device identifier. In this way, a repeat visitor to an environment having a voice-enabled device associated with the remote system may temporarily associate the user account with the voice-enabled device without use of the personal device.

The process 800 may additionally, or alternatively, include receiving, from a second voice-enabled device associated with a second environment, additional audio data representing another user utterance to perform an action. The process 800 may also include identifying, based at least in part on a voice model, a user associated with the user utterance and identifying the user account based at least in part on identifying the user. The process 800 may also include receiving, from the second voice-enabled device, a second device identifier of the second voice-enabled device and associating the account identifier with the second device identifier.

The process 800 may additionally, or alternatively, include identifying an accessory device associated with the voice-enabled device that is situated in the environment and identifying a second device identifier associated with the accessory device. The process 800 may also include associating the account identifier with the second device identifier based at least in part on associating the account identifier with the first device identifier of the voice-enabled device.

The process 800 may additionally, or alternatively, include receiving, from the voice-enabled device, additional audio data representing a request to associate the account identifier with the voice-enabled device and sending, to the voice-enabled device, a directive for the voice-enabled device to output, via a speaker of the voice-enabled device, a second request to provide the contact information.

The process 800 may additionally, or alternatively, include determining a period of time during which the account identifier is to be associated with the device identifier and receiving, during the period of time, second audio data representing a second user utterance requesting performance of the action. The process 800 may also include determining that a resource for performing the action is unassociated with the first user account and determining that the resource is available via a default user account associated with voice-enabled device. The process 800 may also include selecting the default user account based at least in part on determining that the resource is unassociated with the first user account and associated with the default user account.

FIG. 9 illustrates a flow diagram of another example process 900 for temporary account association with voice-enabled devices. The order in which the operations or steps are described is not intended to be construed as a limitation, and any number of the described operations may be combined in any order and/or in parallel to implement process 900.

At block 902, the process 900 may include receiving, from a voice-enabled device, first audio data representing a first user utterance indicating a request to perform an action, the voice-enabled device associated with a default account. For example, a user may speak a user utterance to the voice-enabled device. The microphones of the voice-enabled device may capture the user utterance and may generate corresponding audio data. The audio data may be sent, via a network, to the remote system where the remote system may receive the audio data.

At block 904, the process 900 may include determining that a resource for performing the action is unassociated with the account. For example, an ASR component of the remote system may process the audio data and generate corresponding text data. An NLU component of the remote system may utilize the text data to determine intent data representing an intent of the user to, in these examples, perform an action that utilizes one or more system resources and/or an intent to temporarily associate an account identifier with a voice-enabled device. For example, the user utterance may be "play Song A." The remote system, utilizing the NLU component, may determine that a resource is to be available to perform the action of outputting audio corresponding to Song A. For example, the voice-enabled device may be associated with a default user account associated with an environment. That default user account may not have access to a resource to output Song A. By way of example, the default user account may not be associated with a music service and/or database that permits playing Song A. In these examples, a speechlet of the remote system may be utilized to start the process of temporarily associating a personal user account associated with the user with the voice-enabled device.

At block 906, the process 900 may include identifying, based at least in part on the audio data, an account identifier associated with a user that spoke the first user utterance, the account identifier having previously been associated with a device identifier of at least one of the voice-enabled device or another voice-enabled device. For example, a directive to output audio requesting contact information from the user may be sent to the voice-enabled device. Audio data representing another user utterance that includes the contact information may be received from the voice-enabled device, and the account identifier may be identified using the contact information. Additionally, or alternatively, a user identifier associated with the user utterance may be determined based at least in part on a voice model. The account identifier may be identified based at least in part on determining the user identifier.

At block 908, the process 900 may include receiving confirmation data confirming an intent to associate the account identifier and the device identifier. For example, a message may be sent to a personal device associated with the user account. The message may request confirmation of the intent to associate the account identifier with the device identifier.

At block 910, the process 900 may include causing, based at least in part on receiving the confirmation data, the account identifier to be associated with the device identifier of the voice-enabled device. For example, upon receiving additional audio data from the voice-enabled device, an association-management component of the remote system may be utilized to determine that the user account is actively associated with the device identifier associated with the voice-enabled device. This information may be utilized to determine how to process the audio data and/or which resources may be utilized to perform one or more actions associated with the audio data.

FIG. 10 illustrates a flow diagram of an example process 1000 for dissociating an account with voice-enabled devices. The order in which the operations or steps are described is not intended to be construed as a limitation, and any number of the described operations may be combined in any order and/or in parallel to implement process 1000.

At block 1002, the process 1000 may include receiving a first indication that a temporary association between a first account identifier of a user account and a device identifier of a voice-enabled device associated with an environment is established. For example, a user may speak a user utterance to the voice-enabled device. The microphones of the voice-enabled device may capture the user utterance and may generate corresponding audio data. The audio data may be sent, via a network, to the remote system where the remote system may receive the audio data.

An ASR component of the remote system may process the audio data and generate corresponding text data. An NLU component of the remote system may utilize the text data to determine intent data representing an intent of the user to, in these examples, perform an action that utilizes one or more system resources and/or an intent to temporarily associate a user account with a voice-enabled device. For example, the user utterance may be "play Song A." The remote system, utilizing the NLU component, may determine that a resource is to be available to perform the action of outputting audio corresponding to Song A. For example, the voice-enabled device may be associated with a default user account associated with an environment. That default user account may not have access to a resource to output Song A. By way of example, the default user account may not be associated with a music service and/or database that permits playing Song A. In these examples, a speechlet of the remote system may be utilized to start the process of temporarily associating a personal user account associated with the user with the voice-enabled device.

Audio may be output such as "we can't perform that operation, please provide your phone number to link your account to this device." The user may provide a second user utterance that includes the contact information, here including the telephone number. The microphones of the voice-enabled device may capture audio corresponding to the user utterance and may generate corresponding audio data. The audio data may be sent to the remote system for processing. For example, the ASR component of the remote system may generate text data corresponding to the audio data and representing the contact information.

Data representing the device identifier may be sent from the voice-enabled device to the remote system, such as along with the second audio data. In other examples, the device identifier may be determined by the remote system based at least in part on information associated with the voice-enabled device. Then, a code pair may be generated that associates the contact information with the device identifier associated with a device to which the contact information corresponds to.

A message may be generated and may include a link, or other selectable portion, for account-credential input. The notification component may utilize an authentication-link component of the remote system to generate the message and/or a portion thereof. For example, the authentication-link component may be utilized to identify, determine, and/or generate a selectable portion of the message, such as a webpage link, that when selected may assist in gathering account access information, such as a username and/or password associated with the personal user account. Input data corresponding to input provided by the user and/or identified from an application accessed by the personal device may represent the account credentials and may be generated and sent to the remote system.

Upon receiving additional audio data from the voice-enabled device, an association-management component of the remote system may be utilized to determine that the user account is actively associated with the device identifier associated with the voice-enabled device. This information may be utilized to determine how to process the audio data and/or which resources may be utilized to perform one or more actions associated with the audio data. The association between the user account and the device identifier of the voice-enabled device may be stored, such as at the remote system, and may be utilized for servicing user requests via the voice-enabled device.

At block 1004, the process 1000 may include determining that a dissociation event associated with the voice-enabled device has occurred, the dissociation event representing at least one of lapsing of a period of time identified for maintaining the temporary association or receiving a second indication of the dissociation event from a system associated with the environment. For example, a message may be sent to a personal device that causes and/or allows a website application to display a webpage that allows a user of the personal device to input information associated with their stay at the environment. This information may include, for example, a checkout time and/or a checkout day, from the environment. This information may be utilized to determine a period of time during which the association between the user account and the voice-enabled device is to be maintained, and when the user account should be dissociated from the voice-enabled device such as when the period of time lapses. By providing this functionality, the user is able to control when potentially-personal information and/or capabilities are available to the voice-enabled device and when that information and those capabilities should not be available.

The notification component, and/or other components of the remote system, may be configured to request scheduling data from one or more devices and/or systems associated with the environment. The scheduling data may indicate the period of time that a user is staying at the environment, which may be utilized to identify and/or determine the period of time to maintain the association between the user account and the voice-enabled device.

Additionally, or alternatively, the dissociation events may include receiving an indication that the user has checking out from the environment. Additionally, or alternatively, the remote system may receive additional audio data representing another user utterance, and the remote system may determine that an intent associated with the user utterance is to dissociate the user account from the voice-enabled device.

Receipt of this audio data and/or determining that the user utterance corresponds to an intent to dissociate may be considered a dissociation event. Additionally, or alternatively, the remote system may receive, from a system associated with the environment, an indication that the environment has been checked out of Receipt of this indication may be a dissociation event. The dissociation events may also include temporary dissociation events. For example, the voice-enabled device and/or the remote system may be configured to receive an indication that a lock and/or keycard reader associated with the environment has been utilized to leave a room. Based at least in part on this indication, the association-management component may be configured to temporarily dissociate the user account from the voice-enabled device, such as until the lock and/or keycard reader indicates the user has entered the room.

The association-management component may additionally be configured to determine when one or more events occur that cause the period of time to maintain the association between the user account and the voice-enabled device to change. For example, the remote system may receive an indication that the period of time is to be increased or decreased. By way of example, a user may decide to check out early from a hotel and/or the user may decide to extend his or her stay. In other examples, the indication that the period of time has been increased or decreased may be received from a system associated with the environment. An indication of such an event may be sent to and received by the remote system and may be utilized to identify, determine, and/or generate a second period of time to maintain the association between the user account and the voice-enabled device.

At block 1006, the process 1000 may include dissociating the first account identifier from the device identifier based at least in part on determining that the dissociation event has occurred. Dissociation of the account identifier from the device identifier may result in one or more resources associated with the user account being unassociated with the device identifier.

At block 1008, the process 1000 may include associating a second account identifier corresponding to a default account with the device identifier. For example, the association-management device of the remote system may indicate that the device identifier associated with the voice-enabled device is associated with the default user account and/or another account instead of the user account. Additionally, or alternatively, when subsequent voice commands are processed, the association-management device may not provide an indication of an active account associated with the device identifier, thereby causing the system to associate the default account with the device identifier for those subsequent voice commands.

FIG. 11 illustrates a flow diagram of another example process 1100 for dissociating an account with voice-enabled devices. The order in which the operations or steps are described is not intended to be construed as a limitation, and any number of the described operations may be combined in any order and/or in parallel to implement process 1100.

At block 1102, the process 1100 may include receiving a first indication that an association between a first account identifier of a user account and a device identifier of a voice-enabled device is established. For example, a user may speak a user utterance to the voice-enabled device. The microphones of the voice-enabled device may capture the user utterance and may generate corresponding audio data. The audio data may be sent, via a network, to the remote system where the remote system may receive the audio data.

An ASR component of the remote system may process the audio data and generate corresponding text data. An NLU component of the remote system may utilize the text data to determine intent data representing an intent of the user to, in these examples, perform an action that utilizes one or more system resources and/or an intent to temporarily associate a user account with a voice-enabled device. For example, the user utterance may be "play Song A." The remote system, utilizing the NLU component, may determine that a resource is to be available to perform the action of outputting audio corresponding to Song A. For example, the voice-enabled device may be associated with a default user account associated with an environment. That default user account may not have access to a resource to output Song A. By way of example, the default user account may not be associated with a music service and/or database that permits playing Song A. In these examples, a speechlet of the remote system may be utilized to start the process of temporarily associating a personal user account associated with the user with the voice-enabled device.

Audio may be output such as "we can't perform that operation, please provide your phone number to link your account to this device." The user may provide a second user utterance that includes the contact information, here including the telephone number. The microphones of the voice-enabled device may capture audio corresponding to the user utterance and may generate corresponding audio data. The audio data may be sent to the remote system for processing. For example, the ASR component of the remote system may generate text data corresponding to the audio data and representing the contact information.

Data representing the device identifier may be sent from the voice-enabled device to the remote system, such as along with the second audio data. In other examples, the device identifier may be determined by the remote system based at least in part on information associated with the voice-enabled device. Then, a code pair may be generated that associates the contact information with the device identifier associated with a device to which the contact information corresponds to.

A message may be generated and may include a link, or other selectable portion, for account-credential input. The notification component may utilize an authentication-link component of the remote system to generate the message and/or a portion thereof. For example, the authentication-link component may be utilized to identify, determine, and/or generate a selectable portion of the message, such as a webpage link, that when selected may assist in gathering account access information, such as a username and/or password associated with the personal user account. Input data corresponding to input provided by the user and/or identified from an application accessed by the personal device may represent the account credentials and may be generated and sent to the remote system.

Upon receiving additional audio data from the voice-enabled device, an association-management component of the remote system may be utilized to determine that the user account is actively associated with the device identifier associated with the voice-enabled device. This information may be utilized to determine how to process the audio data and/or which resources may be utilized to perform one or more actions associated with the audio data. The association between the user account and the device identifier of the voice-enabled device may be stored, such as at the remote system, and may be utilized for servicing user requests via the voice-enabled device.

At block 1104, the process 1100 may include determining that a dissociation event has occurred based at least in part on at least one of a period of time lapsing or receiving a second indication of the dissociation event occurring. For example, a message may be sent to a personal device that causes and/or allows a website application to display a webpage that allows a user of the personal device to input information associated with their stay at the environment. This information may include, for example, a checkout time and/or a checkout day, from the environment. This information may be utilized to determine a period of time during which the association between the user account and the voice-enabled device is to be maintained, and when the user account should be dissociated from the voice-enabled device such as when the period of time lapses. By providing this functionality, the user is able to control when potentially-personal information and/or capabilities are available to the voice-enabled device and when that information and those capabilities should not be available.

The notification component, and/or other components of the remote system, may be configured to request scheduling data from one or more devices and/or systems associated with the environment. The scheduling data may indicate the period of time that a user is staying at the environment, which may be utilized to identify and/or determine the period of time to maintain the association between the user account and the voice-enabled device.

Additionally, or alternatively, the dissociation events may include receiving an indication that the user has checking out from the environment. Additionally, or alternatively, the remote system may receive additional audio data representing another user utterance, and the remote system may determine that an intent associated with the user utterance is to dissociate the user account from the voice-enabled device. Receipt of this audio data and/or determining that the user utterance corresponds to an intent to dissociate may be considered a dissociation event. Additionally, or alternatively, the remote system may receive, from a system associated with the environment, an indication that the environment has been checked out of Receipt of this indication may be a dissociation event. The dissociation events may also include temporary dissociation events. For example, the voice-enabled device and/or the remote system may be configured to receive an indication that a lock and/or keycard reader associated with the environment has been utilized to leave a room. Based at least in part on this indication, the association-management component may be configured to temporarily dissociate the user account from the voice-enabled device, such as until the lock and/or keycard reader indicates the user has entered the room.

The association-management component may additionally be configured to determine when one or more events occur that cause the period of time to maintain the association between the user account and the voice-enabled device to change. For example, the remote system may receive an indication that the period of time is to be increased or decreased. By way of example, a user may decide to check out early from a hotel and/or the user may decide to extend his or her stay. In other examples, the indication that the period of time has been increased or decreased may be received from a system associated with the environment. An indication of such an event may be sent to and received by the remote system and may be utilized to identify, determine, and/or generate a second period of time to maintain the association between the user account and the voice-enabled device.

At block 1106, the process 1100 may include dissociating the first account identifier from the device identifier based at least in part on determining that the dissociation event has occurred. Dissociation of the account identifier from the device identifier may result in one or more resources associated with the user account being unassociated with the device identifier.

At block 1108, the process 1100 may include associating a second account identifier corresponding to a default account with the device identifier. For example, the association-management device of the remote system may indicate that the device identifier associated with the voice-enabled device is associated with the default user account and/or another account instead of the user account. Additionally, or alternatively, when subsequent voice commands are processed, the association-management device may not provide an indication of an active account associated with the device identifier, thereby causing the system to associate the default account with the device identifier for those subsequent voice commands.

The process 1100 may additionally, or alternatively, include receiving, from a personal device associated with the user account, an indication that the period of time is to be increased or decreased and determining a second period of time to maintain the association between the account identifier and the device identifier based at least in part on the indication that the period of time is to be increased or decreased. In these examples, dissociating the account identifier from the device identifier may be based at least in part on the second period of time lapsing. Additionally, or alternatively, the indication that the period of time is to be increased or decreased may be received from a system associated with the environment.

The process 1100 may additionally, or alternatively, include receiving, from an accessory device associated with an egress point of the environment, an indication that a user associated with the user account has left the environment and dissociating the account identifier from the device identifier based at least in part on receiving the indication. The indication may be, for example, that a door has been opened, that a lock has been unlocked, that a door handle and/or knob has been turned, that a keycard has been swiped and/or placed into a keycard reader, etc. The process 1100 may also include receiving, from the accessory device, a second indication that the user has reentered the environment during the period of time and associating the account identifier with the device identifier based at least in part on the second indication.

Figure 12:
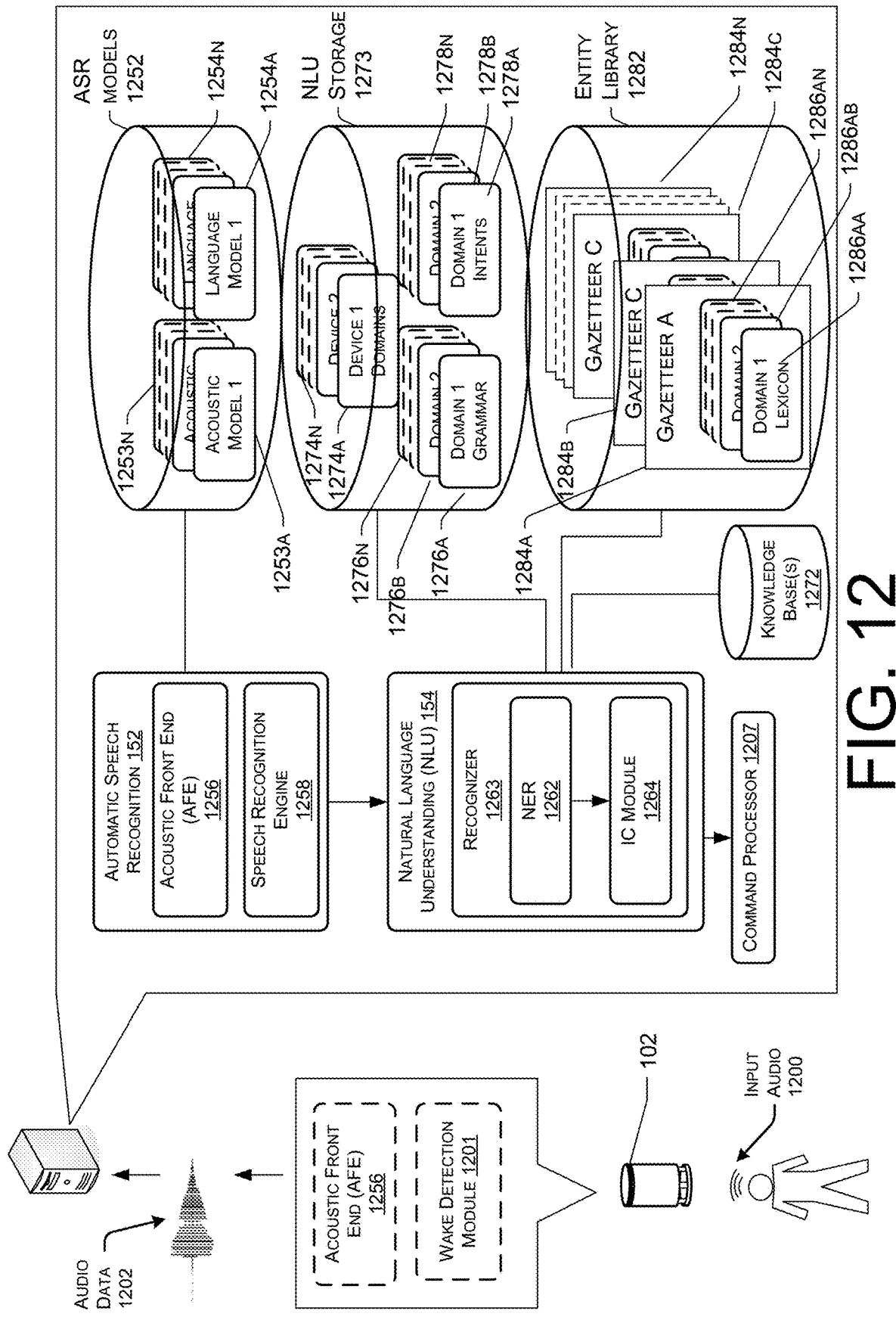
FIG. 12 illustrates a conceptual diagram of components of a speech processing system for processing audio data provided by one or more devices.

FIG. 12 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 120). The various components illustrated may be located on a same or different physical devices. Message between various components illustrated in FIG. 12 may occur directly or across a network 122. An audio capture component, such as a microphone 112 of the device 102, or another device, captures audio 1200 corresponding to a spoken utterance. The device 102, using a wakeword detection module 1201, then processes audio data corresponding to the audio 1200 to determine if a keyword (such as a wakeword) is detected in the audio data. Following detection of a wakeword, the device 102 sends audio data 1202 corresponding to the utterance to the remote system 120 that includes an ASR module 152. The audio data 1202 may be output from an optional acoustic front end (AFE) 1256 located on the device prior to transmission. In other instances, the audio data 1202 may be in a different form for processing by a remote AFE 1256, such as the AFE 1256 located with the ASR module 152 of the remote system 120.

The wakeword detection module 1201 works in conjunction with other components of the user device, for example a microphone to detect keywords in audio 1200. For example, the device may convert audio 1200 into audio data, and process the audio data with the wakeword detection module 1201 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 1201 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1201 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence.

This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1202 corresponding to input audio 1200 to the remote system 120 for speech processing. Audio data corresponding to that audio may be sent to remote system 120 for routing to a recipient device or may be sent to the remote system 120 for speech processing for interpretation of the included speech (either for purposes of enabling voice-messages and/or for purposes of executing a command in the speech). The audio data 1202 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 120, an ASR module 152 may convert the audio data 1202 into text. The ASR transcribes audio data into text data representing the words of the speech contained in the audio data 1202. The text data may then be used by other components for various purposes, such as executing system commands, inputting data, etc. A spoken utterance in the audio data is input to a processor configured to perform ASR which then interprets the utterance based on the similarity between the utterance and pre-established language models 1254 stored in an ASR model knowledge base (ASR Models Storage 1252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1253 stored in an ASR Models Storage 1252), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 152 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1256 and a speech recognition engine 1258. The acoustic front end (AFE) 1256 transforms the audio data from the microphone into data for processing by the speech recognition engine 1258. The speech recognition engine 1258 compares the speech recognition data with acoustic models 1253, language models 1254, and other data models and information for recognizing the speech conveyed in the audio data. The AFE 1256 may reduce noise in the audio data and divide the digitized audio data into frames representing time intervals for which the AFE 1256 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in speech/model storage (1252). Alternatively, post front-end processed data (such as feature vectors) may be received by the device executing ASR processing from another source besides the internal AFE. For example, the user device may process audio data into feature vectors (for example using an on-device AFE 1256) and transmit that information to a server across a network for ASR processing. Feature vectors may arrive at the remote system 120 encoded, in which case they may be decoded prior to processing by the processor executing the speech recognition engine 1258.

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play Song A" or "Alexa, play Movie B on the television." The wake detection module may identify the wake word, otherwise described as a trigger expression, "Alexa," in the user utterance and may "wake" based on identifying the wake word. Audio data corresponding to the user utterance may be sent to the remote system 120, where the speech recognition engine 1258 may identify, determine, and/or generate text data corresponding to the user utterance, here "play Song A" or "play Movie B on the television."

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1258 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 120, for natural language understanding (NLU) processing, such as conversion of the text into commands for execution, either by the user device, by the remote system 120, or by another device (such as a server running a specific application like a search engine, etc.).

The device performing NLU processing 154 (e.g., server 120) may include various components, including potentially dedicated processor(s), memory, storage, etc. As shown in FIG. 12, an NLU component 154 may include a recognizer 1263 that includes a named entity recognition (NER) module 1262 which is used to identify portions of query text that correspond to a named entity that may be recognizable by the system. A downstream process called named entity resolution links a text portion to a specific entity known to the system. To perform named entity resolution, the system may utilize gazetteer information (1284*a*-1284*n*) stored in entity library storage 1282. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 152 based on the utterance input audio 1200) and attempts to make a semantic interpretation of the text. That is, the NLU process determines the meaning behind the text based on the individual words and then implements that meaning. NLU processing 154 interprets a text string to derive an intent or a desired action from the user as well as the pertinent pieces of information in the text that allow a device (e.g., device 102) to complete that action. For example, if a spoken utterance is processed using ASR 152 and outputs the text "play Song A" the NLU process may determine that the user intended to have audio corresponding to Song A output via the voice-enabled device.

The NLU may process several textual inputs related to the same utterance. For example, if the ASR 152 outputs N text segments (as part of an N-best list), the NLU may process all N outputs to obtain NLU results.

As will be discussed further below, the NLU process may be configured to parse and tag to annotate text as part of NLU processing. For example, for the text "play Song A," "play" may be tagged as a command (to output audio) and "Song A" may be tagged as the identifier of the audio to be output.

To correctly perform NLU processing of speech input, an NLU process 154 may be configured to determine a "domain" of the utterance so as to determine and narrow down which services offered by the endpoint device (e.g., remote system 120 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1262 receives a query in the form of ASR results and attempts to identify relevant grammars and lexical information that may be used to construe meaning. To do so, the NLU module 154 may begin by identifying potential domains that may relate to the received query. The NLU storage 1273 includes a database of devices (1274a-1274n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1263, language model and/or grammar database (1276a-1276n), a particular set of intents/actions (1278a-1278n), and a particular personalized lexicon (1286). Each gazetteer (1284a-1284n) may include domain-indexed lexical information associated with a particular user and/or device. For example, the Gazetteer A (1284a) includes domain-index lexical information 1286aa to 1286an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) module 1264 parses the query to determine an intent or intents for each identified domain, where the intent corresponds to the action to be performed that is responsive to the query. Each domain is associated with a database (1278a-1278n) of words linked to intents. For example, a music intent database may link words and phrases such as "quiet," "volume off," and "mute" to a "mute" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC module 1264 identifies potential intents for each identified domain by comparing words in the query to the words and phrases in the intents database 1278. In some instances, the determination of an intent by the IC module 1264 is performed using a set of rules or templates that are processed against the incoming text to identify a matching intent.

In order to generate a particular interpreted response, the NER 1262 applies the grammar models and lexical information associated with the respective domain to actually recognize a mention of one or more entities in the text of the query. In this manner, the NER 1262 identifies "slots" or values (i.e., particular words in query text) that may be needed for later command processing. Depending on the complexity of the NER 1262, it may also label each slot with a type of varying levels of specificity (such as noun, place, city, artist name, song name, amount of time, timer number, or the like). Each grammar model 1276 includes the names of entities (i.e., nouns) commonly found in speech about the particular domain (i.e., generic terms), whereas the lexical information 1286 from the gazetteer 1284 is personalized to the user(s) and/or the device. For instance, a grammar model associated with the shopping domain may include a database of words commonly used when people discuss shopping.

The intents identified by the IC module 1264 are linked to domain-specific grammar frameworks (included in 1276) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "play Song A" is an identified intent, a grammar (1276) framework or frameworks may correspond to sentence structures such as "play {Song A}."

For example, the NER module 1262 may parse the query to identify words as subject, object, verb, preposition, etc., based on grammar rules and/or models, prior to recognizing named entities. The identified verb may be used by the IC module 1264 to identify intent, which is then used by the NER module 1262 to identify frameworks. A framework for the intent of "play a song," meanwhile, may specify a list of slots/fields applicable to play the identified "song" and any object modifier (e.g., specifying a music collection from which the song should be accessed) or the like. The NER module 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 1262 may search the database of generic words associated with the domain (in the knowledge base 1272). So, for instance, if the query was "play Song A," after failing to determine which song to play, the NER component 1262 may search the domain vocabulary for the phrase "Song A". In the alternative, generic words may be checked before the gazetteer information, or both may be tried, potentially producing two different results.

The output data from the NLU processing (which may include tagged text, commands, etc.) may then be sent to a command processor 1207. The destination command processor 1207 may be determined based on the NLU output. For example, if the NLU output includes a command to send a message, the destination command processor 1207 may be a message sending application, such as one located on the user device or in a message sending appliance, configured to execute a message sending command. If the NLU output includes a search request, the destination command processor 1207 may include a search engine processor, such as one located on a search server, configured to execute a search command. After the appropriate command is generated based on the intent of the user, the command processor 1207 may provide some or all of this information to a text-to-speech (TTS) engine 158. The TTS engine 158 may then generate an actual audio file for outputting the audio data determined by the command processor 1207 (e.g., "account successfully linked," or "try your request again"). After generating the file (or "audio data"), the TTS engine 158 may provide this data back to the remote system 120.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 154 during runtime operations where NLU operations are performed on text (such as text output from an ASR component 152). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1263. Each recognizer may include various NLU components such as an NER component 1262, IC module 1264 and other components such as an entity resolver, or other components.

For example, a messaging domain recognizer 1263-A (Domain A) may have an NER component 1262-A that identifies what slots (i.e., portions of input text) may correspond to particular words relevant to that domain. The words may correspond to entities such as (for the messaging domain) a recipient. An NER component 1262 may use a machine learning model, such as a domain specific conditional random field (CRF) to both identify the portions corresponding to an entity as well as identify what type of entity corresponds to the text portion. The messaging domain recognizer 1263-A may also have its own intent classification (IC) component 1264-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 120 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 120, as illustrated herein are exemplary, and may be located in a stand-alone device or may be included, in whole or in part, as a component of a larger device or system, may be distributed across a network or multiple devices connected by a network, etc.

Figure 13:
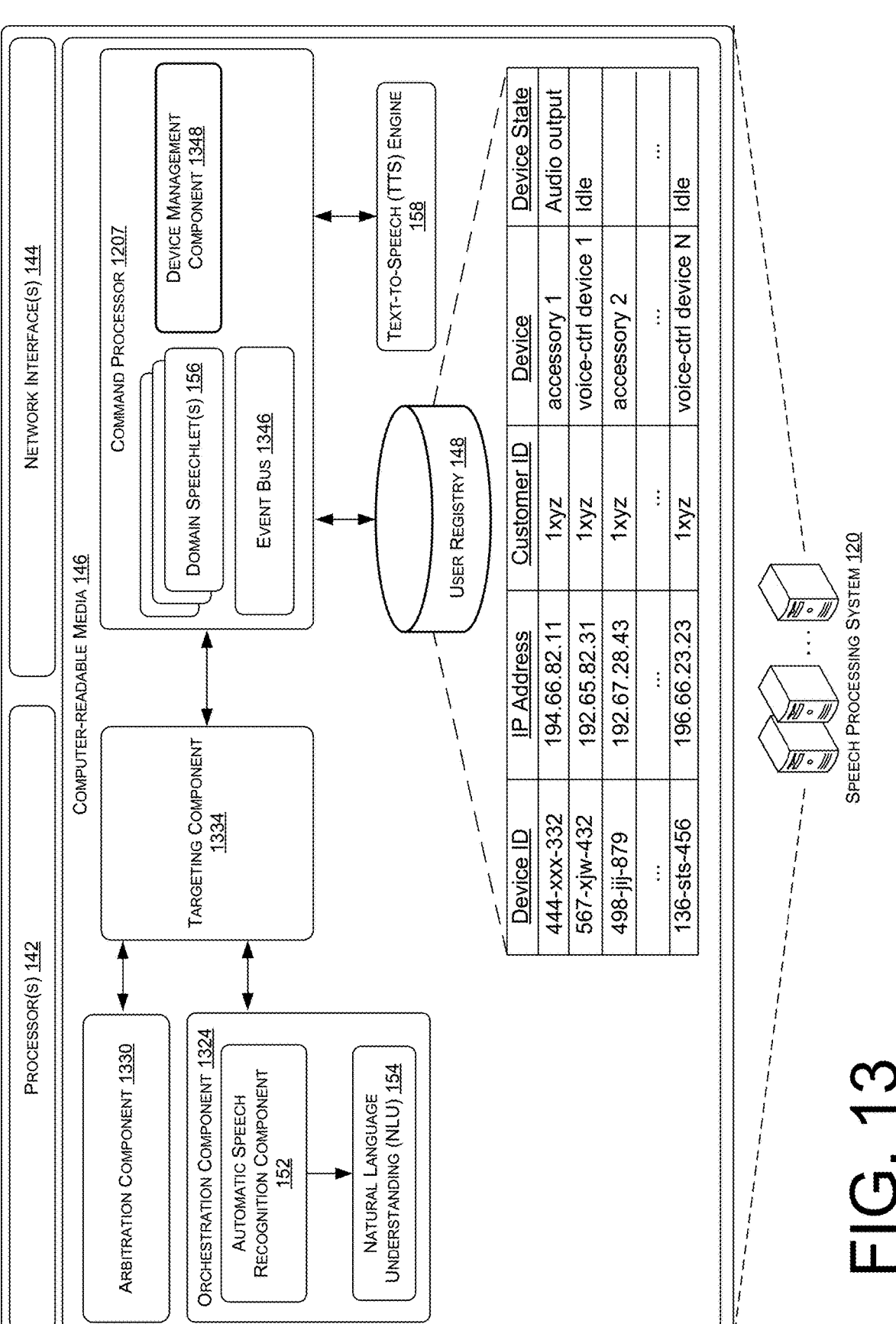
FIG. 13 illustrates a conceptual diagram of components of a speech processing system for establishing temporary account associations with voice-enabled devices.

FIG. 13 illustrates a conceptual diagram of components of a speech processing system 120 associating audio output commands with multiple devices, including a command processor 1207 configured to generate a command that the selected voice-enabled device uses to respond to a user utterance. As used with respect to FIG. 12, a voice-enabled device may include a voice-enabled device 102, such as described with respect to FIG. 1B. As illustrated in FIG. 12, the speech processing system 120, including the orchestration component 1324 comprising the ASR component 152 and the NLU component 154, may be coupled to the targeting component 1334 and provide the targeting component 1334 with the intent determined to be expressed in the user utterance. Further, the arbitration component 1330 may provide the ranked list of devices to the targeting component 1334, as well as device indicators (e.g., IP addresses, devices names, etc.) for one or more of the voice-enabled devices in the ranked list of devices. The targeting component 1334 may then perform techniques to determine a target device (e.g., a device to perform the requested operation), and provide various data to the command processor 1207. For instance, the targeting component 1334 may provide the command processor 1207 with various device identifiers of the voice-enabled devices, the determined target device, the determined intent and/or command, etc.

The command processor 1207 and/or NLU component 154 may determine a domain based on the intent and, based on this determination, route the request corresponding to the audio data to the appropriate domain speechlet, such as the illustrated domain speechlets 156. The domain speechlet 156 may comprise any type of device or group of devices (e.g., hardware device, virtual devices or partitions, server, etc.), and may receive the text data and/or an intent associated with the audio signals and may determine how to respond to the request. For instance, the intent for a command "play Song A" may be routed to a music domain speechlet 156, which controls generation of directive data for sending to voice-enabled devices for outputting audio corresponding to songs.

Various types of domain speechlets 156 may be used to determine which devices to send commands to and/or to use in response to a user utterance, as well as the appropriate response and potential additional content (e.g., audio data). For example, the domain speechlets 156 may include a third party skills domain speechlet 156, which may handle intents associated with gaming, productivity, etc., a music domain speechlet 156, which may handle intents associated with music play requests (e.g., Amazon Music, Pandora, Spotify, iHeart, etc.), and/or an information domain speechlet 156, which may handle requests for information associated, for example, with the status of a particular device and/or content being utilized and/or output by a particular device and/or group of devices.

After the domain speechlet 156 generates the appropriate command, which may be described herein as directive data, based on the intent of the user, and/or provides additional content, such as audio data, to be output by one of the voice-enabled devices, the domain speechlet 156 may provide this information back to the speech system 120, which in turns provides some or all of this information to a text-to-speech (TTS) engine 158. The TTS engine 158 then generates an actual audio file for outputting the second audio data determined by the domain speechlet 156. After generating the file (or "audio data"), the TTS engine 158 may provide this data back to the speech system 120.

The speech system 120 may then publish (i.e., write) some or all of this information to an event bus 1346. That is, the speech system 120 may provide information regarding the initial request (e.g., the speech, the text, the domain/intent, etc.), the response to be provided to the voice-enabled device, or any other information pertinent to the interaction between the voice-enabled device and the speech processing system 120 to the event bus 1346.

Within the speech processing system 120, one or more components or services may subscribe to the event bus 1346 so as to receive information regarding interactions between user devices and the speech processing system 120. In the illustrated example, for instance, the device management component 1348 may subscribe to the event bus 1346 and, thus, may monitor information regarding these interactions. In some examples, monitoring information in the event bus 1346 may comprise messages between various components of the speech processing system 120. For example, the targeting component 1334 may monitor the event bus 1346 to identify device state data for voice-enabled devices. In some examples, the event bus 1346 may "push" or send indications of events and/or device state data to the targeting component 1334. Additionally, or alternatively, the event bus 1346 may be "pulled" where the targeting component 1334 sends requests to the event bus 1346 to provide an indication of device state data for a voice-enabled device. The event bus 1346 may store indications of the device states for the devices, such as in a database (e.g., user registry 148), and using the stored indications of the device states, send the device state data for voice-enabled devices to the targeting component 1334. Thus, to identify device state data for a device, the targeting component 1334 may send a request to the event bus 1346 (e.g., event component) to provide an indication of the device state data associated with a device, and receive, from the event bus 1346, the device state data that was requested.

The device management component 1348 functions to monitor information published to the event bus 1346 and identify events that may trigger action. For instance, the device management component 1348 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 1348 may reference the user registry 148 to determine which voice-enabled devices are associated with secondary devices, as well as determine device types, states, and other capabilities of these secondary devices. For instance, the device management component 1348 may determine, from the information published to the event bus 1346, an identifier associated with the voice-enabled device making the corresponding request or the voice-enabled device selected to respond to or act upon the user utterance. The device management component 1348 may use this identifier to identify, from the user registry 148, a user account associated with the voice-enabled device. The device management component 1348 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 1348 may determine whether a particular event identified is associated with supplemental content. That is, the device management component 1348 may write, to a datastore, indications of which types of events and/or which primary content or responses are associated with supplemental content. In some instances, the speech processing system 120 may provide access to third-party developers to allow the developers to register supplemental content for output on secondary devices for particular events and/or primary content. For example, if a voice-enabled device is to output that the weather will include thunder and lightning, the device management component 1348 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1348 may store an association between the primary response or content (e.g., outputting of information regarding the world's largest mammal) and corresponding supplemental content (e.g., the audio data, image data, or the like). In some instances, the device management component 1348 may also indicate which types of secondary devices are to output which supplemental content. For instance, in the instant example, the device management component 1348 may store an indication that secondary devices of a class type "tablet" are to output a picture of a blue whale. In these and other instances, meanwhile, the device management component 1348 may store the supplemental content in association with secondary-device capabilities (e.g., devices with speakers output the audio commentary, devices with screens output the image, etc.).

The device management component 1348 may also determine how to transmit response and/or supplement content (and/or information acquiring the content) to the voice-enabled devices and/or the secondary devices. To make this determination, the device management component 1348 may determine a device type of the voice-enabled devices and/or secondary devices, capabilities of the device(s), or the like, potentially as stored in the user registry 148. In some instances, the device management component 1348 may determine that a particular device is able to communicate directly with the speech processing system 120 (e.g., over WiFi) and, thus, the device management component 1348 may provide the response and/or content directly over a network 122 to the secondary device (potentially via the speech system 120). In another example, the device management component 1348 may determine that a particular secondary device is unable to communicate directly with the speech processing system 120, but instead is configured to communicate with a voice-enabled device in its environment over short-range wireless networks. As such, the device management component 1348 may provide the supplement content (or information) to the speech system 120, which in turn may send this to the voice-enabled device, which may send the information over a short-range network to the secondary device.

The computer-readable media 146 may further include the user registry 148 that includes data regarding user profiles as described herein. The user registry 148 may be located part of, or proximate to, the speech processing system 120, or may otherwise be in message with various components, for example over the network 122. The user registry 148 may include a variety of information related to individual users, accounts, etc. that interact with the voice-enabled devices, and the speech processing system 120. For illustration, the user registry 148 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 148 may store indications of associations between various voice-enabled devices and/ or secondary device, such as virtual clusters of devices, states of devices, and associations between devices and audio-session queues. The user registry 148 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the command processor 1207 and/or the domain speechlets 156 may determine, based on the stored device states in the user registry 148, a current device state of the voice-enabled devices. Rather than receiving device states for the voice-enabled devices, in metadata, the device states may already have been determined or received and stored in the user registry 148. Further, the user registry 148 may provide indications of various permission levels depending on the user. As an example, the speech system 120 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 1346 may publish different events which indicate device states to various entities or components that subscribe to the event bus 1346. For instance, if an event of "play Song A" occurs for a voice-enabled device, the event bus 1346 may publish the indication of this event, and thus the device state of the voice-enabled device from which the audio data was received may be determined. Thus, various components, such as the targeting component 1334, may be provided with indications of the various device states via the event bus 1346. The event bus 1346 may further store and/or update device states for the voice-enabled devices in the user registry 148. The components of the speech processing system 120 may query the user registry 148 to determine device states.

A particular user profile may include a variety of data that may be used by the system 120. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving audio data representing a user utterance captured at a voice-enabled device;
   determining a voice signature of the audio data;
   determining account data associated with the voice signature;
   determining, based at least in part on the audio data, intent data representing a request to perform an action;
   identifying a first application configured to process the intent data;
   identifying a second application configured to process the intent data;
   determining, by an association-management component implemented as computer-readable instructions stored in memory and executed by one or more processors, that the first application is associated with the account data;
   determining, by the association-management component, that the second application is unassociated with the account data;
   selecting the first application to process the intent data instead of the second application based at least in part on the determining, by the association-management component, that the first application is associated with the account data and the second application is unassociated with the account data; and
   causing the action to be performed utilizing the first application.

2. The method of claim 1, further comprising:
   storing data representing multiple voice signatures including the voice signature; and
   parsing the multiple voice signatures to determine which of the multiple voice signatures is most similar to the voice signature of the audio data.

3. The method of claim 1, further comprising:
   determining, based at least in part on the voice signature, that a user that provided the user utterance is a guest user with respect to the voice-enabled device; and
   associating a guest user designation with the action.

4. The method of claim 1, further comprising:
   determining that the account data is associated with a device of an environment in which the voice-enabled device is not situated;
   determining that the intent data is for performing the action in association with the device; and
   sending a command to perform the action to the device.

5. The method of claim 1, further comprising selecting the action from multiple actions based at least in part on selecting the first application to process the intent data.

6. The method of claim 1, wherein the action comprises a first action, and the method further comprises:
   determining, using the first application, the first action is associated with the intent data;
   determining, using the first application, a second action associated with the intent data, the second action differing from the first action; and
   selecting the first action for performance instead of the second action based at least in part on historical usage data.

7. The method of claim 1, further comprising:

sending a command to the voice-enabled device, the command causing output of audio requesting confirmation of the account data;

receiving user input data indicating confirmation of the account data; and wherein causing the action to be performed comprises causing the action to be performed based at least in part on the user input data indicating confirmation of the account data.

8. The method of claim 1, wherein determining that the first application is associated with the account data is based at least in part on the first application being selected for use with the voice-enabled device prior to receiving the audio data.

9. The method of claim 1, wherein:

the first application is associated with a first set of actions; and the second application is associated with a second set of actions that differ at least in part from the first set of actions.

10. The method of claim 1, further comprising:

sending, to the first application, first data requesting the first application to determine the action to be performed and including an identifier of the account data; and receiving, from the first application, second data representing a command to perform the action, the action based at least in part on the identifier of the account data.

11. A system comprising:

one or more processors; and non-transitory computer-readable media storing instructions that, when executed by the one or more processors, cause the one or more processors to perform operations comprising:

receiving audio data representing a user utterance captured at a voice-enabled device;

determining a voice signature of the audio data;

determining account data associated with the voice signature;

determining, based at least in part on the audio data, intent data representing a request to perform an action;

identifying a first application configured to process the intent data;

identifying a second application configured to process the intent data;

determining, by an association-management component implemented as computer-readable instructions stored in memory and executed by one or more processors, that the first application is associated with the account data;

determining, by the association-management component, that the second application is unassociated with the account data;

selecting the first application to process the intent data instead of the second application based at least in part on the determining, by the association-management component, that the first application is associated with the account data and the second application is unassociated with the account data; and causing the action to be performed utilizing the first application.

12. The system of claim 11, the operations further comprising:

storing data representing multiple voice signatures including the voice signature; and parsing the multiple voice signatures to determine which of the multiple voice signatures is most similar to the voice signature of the audio data.

13. The system of claim 11, the operations further comprising:

determining, based at least in part on the voice signature, that a user that provided the user utterance is a guest user with respect to the voice-enabled device; and associating a guest user designation with the action.

14. The system of claim 11, the operations further comprising:

determining that the account data is associated with a device of an environment in which the voice-enabled device is not situated;

determining that the intent data is for performing the action in association with the device; and sending a command to perform the action to the device.

15. The system of claim 11, the operations further comprising selecting the action from multiple actions based at least in part on selecting the first application to process the intent data.

16. The system of claim 11, wherein the action comprises a first action, and the operations further comprise:

determining, using the first application, the first action is associated with the intent data;

determining, using the first application, a second action associated with the intent data, the second action differing from the first action; and selecting the first action for performance instead of the second action based at least in part on historical usage data.

17. The system of claim 11, the operations further comprising:

sending a command to the voice-enabled device, the command causing output of audio requesting confirmation of the account data;

receiving user input data indicating confirmation of the account data; and wherein causing the action to be performed comprises causing the action to be performed based at least in part on the user input data indicating confirmation of the account data.

18. The system of claim 11, wherein determining that the first application is associated with the account data is based at least in part on the first application being selected for use with the voice-enabled device prior to receiving the audio data.

19. The system of claim 11, wherein:

the first application is associated with a first set of actions; and the second application is associated with a second set of actions that differ at least in part from the first set of actions.

20. The system of claim 11, the operations further comprising:

sending, to the first application, first data requesting the first application to determine the action to be performed and including an identifier of the account data; and receiving, from the first application, second data representing a command to perform the action, the action based at least in part on the identifier of the account data.

* * * * *